United States Patent
Arakawa et al.

(10) Patent No.: US 7,469,289 B2
(45) Date of Patent: *Dec. 23, 2008

(54) STORAGE SYSTEM HAVING VIRTUALIZED RESOURCE

(75) Inventors: Hiroshi Arakawa, Sagamihara (JP); Takashi Oeda, Sagamihara (JP); Naoto Matsunami, Hayama (JP); Ryusuke Ito, Chigasaki (JP)

(73) Assignee: Hitachi, Ltd., Tokyo (JP)

( * ) Notice: Subject to any disclaimer, the term of this patent is extended or adjusted under 35 U.S.C. 154(b) by 120 days.

This patent is subject to a terminal disclaimer.

(21) Appl. No.: 11/482,670

(22) Filed: Jul. 6, 2006

(65) Prior Publication Data

US 2006/0253549 A1 Nov. 9, 2006

Related U.S. Application Data

(63) Continuation of application No. 10/355,695, filed on Jan. 30, 2003, now Pat. No. 7,222,172.

(30) Foreign Application Priority Data

Apr. 26, 2002 (JP) ............................. 2002-125168

(51) Int. Cl.
*G06F 15/173* (2006.01)
(52) U.S. Cl. ................. 709/224; 709/219; 709/223; 709/226; 711/112; 711/114; 711/154; 711/161; 707/9; 707/204
(58) Field of Classification Search ............... 709/219, 709/223, 224, 225, 226, 227; 711/4, 112, 711/114, 154, 161, 162; 707/9, 204
See application file for complete search history.

(56) References Cited

U.S. PATENT DOCUMENTS 4,993,030 A 2/1991 Krakauer et al.

(Continued)

FOREIGN PATENT DOCUMENTS

EP 0881560 12/1998

(Continued)

OTHER PUBLICATIONS

"Enterprise Storage Update," A.G. Edwards pp. 2-21 (Dec. 3, 2001).

(Continued)

*Primary Examiner*—Yves Dalencourt
(74) *Attorney, Agent, or Firm*—Townsend and Townsend and Crew LLP

(57) ABSTRACT

A storage system configured to provide a storage area to a host coupled to the storage system includes a first storage device of first type being configured to store data and provide one or more data-storage-related functions. A second storage device of second type is configured to store data and provide one or more data-storage-related functions. A virtual volume provides a storage location and being associated with at least one of the first and second storage devices. A database includes information relating to the one or more data-storage-related functions that the first and second storage devices are configured to perform. A first server is coupled to the first and second storage devices and having access to the database, the first server being configured to access the database in response to a data-storage-related-function request from the host involving at least one of the first and second storage devices. The database is accessed to determine whether or not the at least one of the first and second storage devices is capable of performing the request from the host. The first server further being configured to perform the request if the determination is negative or provide an instruction to the at least one of the first and second storage devices to perform to the request if the determination is positive.

30 Claims, 9 Drawing Sheets

U.S. PATENT DOCUMENTS

| | | | |
|---|---|---|---|
| 5,680,640 A | 10/1997 | Ofek et al. | |
| 5,682,509 A | 10/1997 | Kabenjian et al. | |
| 5,720,028 A | 2/1998 | Matsumoto et al. | |
| 5,809,285 A | 9/1998 | Hilland | |
| 5,875,479 A | 2/1999 | Blount et al. | |
| 5,896,548 A | 4/1999 | Ofek | |
| 5,951,694 A | 9/1999 | Choquier et al. | |
| 6,108,684 A | 8/2000 | DeKoning et al. | |
| 6,108,748 A | 8/2000 | Ofek et al. | |
| 6,199,146 B1 | 3/2001 | Pence | |
| 6,240,486 B1 | 5/2001 | Ofek et al. | |
| 6,353,878 B1 | 3/2002 | Dunham | |
| 6,356,977 B2 | 3/2002 | Ofek et al. | |
| 6,366,987 B1 | 4/2002 | Tzelnic et al. | |
| 6,389,432 B1 | 5/2002 | Pothapragada et al. | |
| 6,446,161 B1 | 9/2002 | Yamamoto et al. | |
| 6,502,205 B1 | 12/2002 | Yanai et al. | |
| 6,560,673 B2 | 5/2003 | Elliott | |
| 6,598,134 B2 | 7/2003 | Ofek et al. | |
| 6,601,101 B1 | 7/2003 | Lee et al. | |
| 6,676,260 B2 | 1/2004 | Cobb et al. | |
| 6,708,227 B1 | 3/2004 | Cabrera et al. | |
| 6,711,571 B2 | 3/2004 | Putzolu | |
| 6,779,093 B1 | 8/2004 | Gupta | |
| 6,823,336 B1 | 11/2004 | Srinivasan et al. | |
| 6,871,295 B2 | 3/2005 | Ulrich et al. | |
| 6,883,073 B2 | 4/2005 | Arakawa et al. | |
| 6,895,483 B2 | 5/2005 | Eguchi et al. | |
| 6,912,588 B1 | 6/2005 | Jardin et al. | |
| 6,915,379 B2 | 7/2005 | Honda et al. | |
| 6,961,838 B2 | 11/2005 | Reuter et al. | |
| 7,117,336 B2 | 10/2006 | Mimatsu et al. | |
| 7,222,172 B2 * | 5/2007 | Arakawa et al. | 709/224 |
| 2001/0052051 A1 | 12/2001 | Kim et al. | |
| 2002/0004857 A1 | 1/2002 | Arakawa et al. | |
| 2002/0091898 A1 | 7/2002 | Matsunami et al. | |
| 2002/0103889 A1 | 8/2002 | Markson et al. | |
| 2002/0103980 A1 | 8/2002 | Crockett et al. | |
| 2003/0187847 A1 | 10/2003 | Lubbers et al. | |
| 2003/0204572 A1 | 10/2003 | Mannen et al. | |
| 2003/0217119 A1 | 11/2003 | Raman et al. | |
| 2003/0221077 A1 | 11/2003 | Ohno et al. | |
| 2004/0073831 A1 | 4/2004 | Yanai et al. | |
| 2004/0103261 A1 | 5/2004 | Honda et al. | |
| 2004/0139124 A1 | 7/2004 | Kawamura et al. | |
| 2004/0193795 A1 | 9/2004 | Takeda et al. | |

FOREIGN PATENT DOCUMENTS

| | | |
|---|---|---|
| EP | 0981091 | 2/2000 |
| JP | 06-075707 A | 3/1994 |
| JP | 11-338640 A | 12/1999 |
| JP | 2000-276406 | 10/2000 |
| JP | 2001-195201 A | 7/2001 |
| JP | 2002-063063 A | 2/2002 |
| JP | 2003-316616 A | 11/2003 |
| JP | 2004-151761 A | 5/2004 |
| WO | WO01/82083 A1 | 11/2001 |

OTHER PUBLICATIONS

"Equity Research," Morgan Keegan & Company, Inc. pp. 1-20. (Jul. 5, 2000).

"Concurrent Copy," IBM Technical Disclosure Bulletin vol. 37, No. 048, pp. 145-147 (Apr. 1994).

* cited by examiner

FIG.6

| Virtual logical volume number | Virtual storage area size | Storage subsystem number | Logical volume number | Storage area address | Storage area size |
|---|---|---|---|---|---|
| 0 | 4000 | 1 | 2 | 10000 | 4000 |
| 1 | 3000 | 3 | 1 | 0 | 1000 |
|   |      | 2 | 3 | 5000 | 2000 |
|   |   |   |   |   |   |

FIG.7

| Path address provided to host | Logical unit Number | Virtual logical volume number |
|---|---|---|
| WWN = 00:11:22:33:44:55:66:77<br>Port Address = 1 | 1 | 0 |
| WWN = 00:10:20:30:40:50:60:70<br>Port Address = 2 | 0 | 1 |
|   |   |   |

FIG.8

| Path address | Logical unit Number | Storage subsystem number | Virtual logical volume number |
|---|---|---|---|
| WWN = 01:02:03:04:05:06:07:08<br>Port Address = 11 | 2 | 1 | 0 |
| WWN = 11:22:33:44:55:66:77:88<br>Port Address = 12 | 3 | 3 | 1 |
| WWN = 21:22:23:24:25:26:27:28<br>Port Address = 13 | 1 | 2 | 1 |
|   |   |   |   |

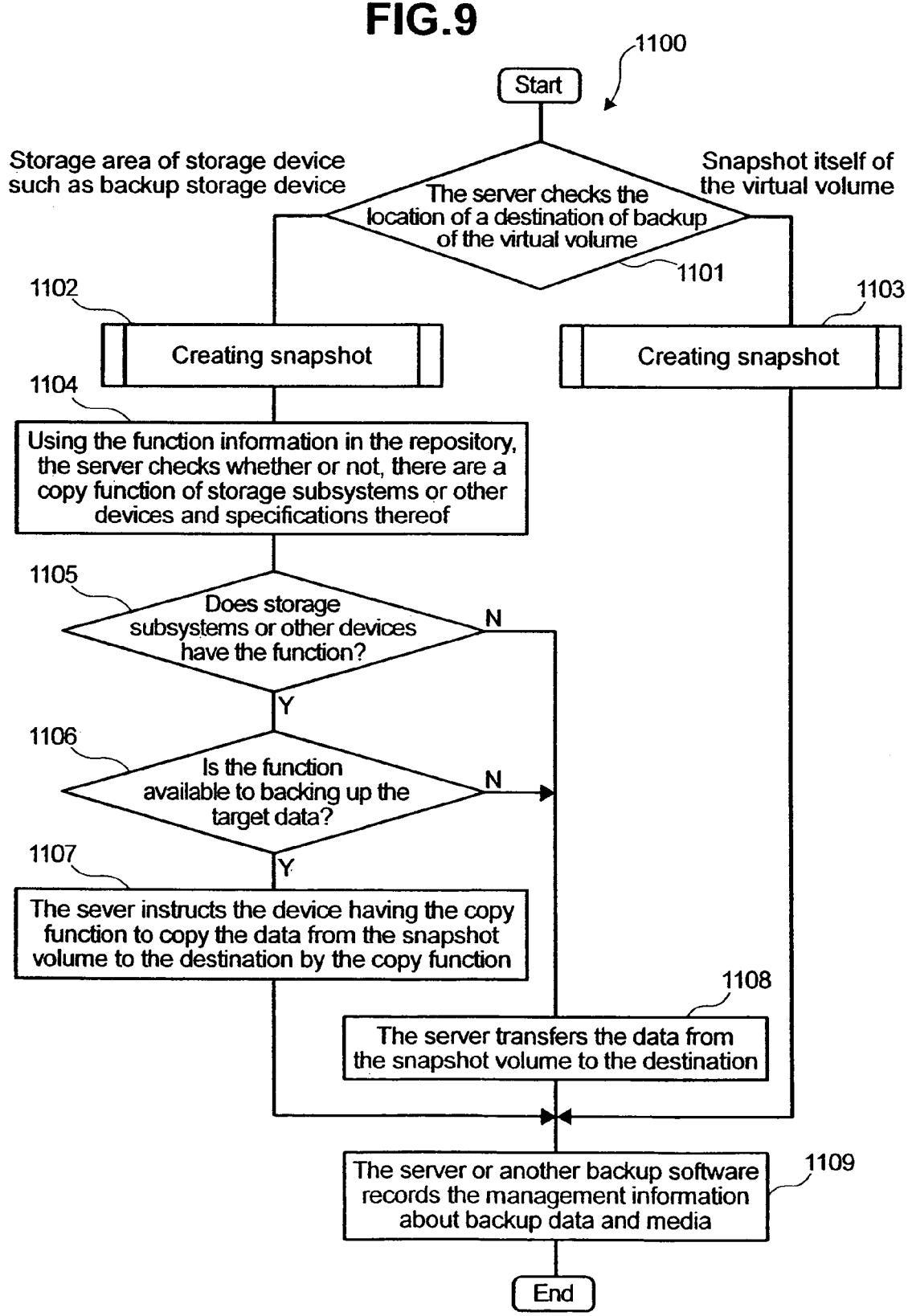

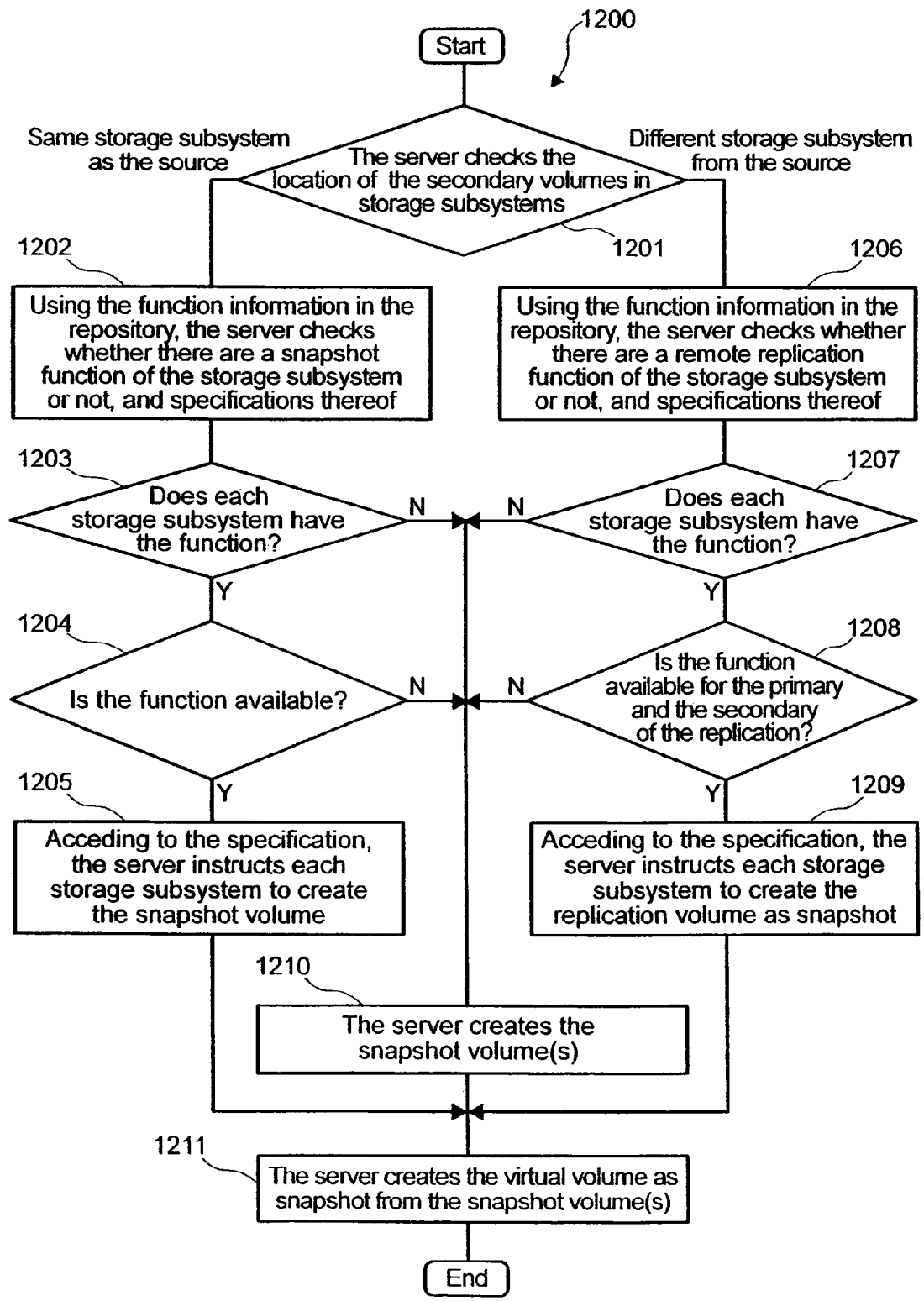

| Storage subsystem number | Copy function | Function availability | Type | Available copy | Maximum Number of destinations | Number of concurrent operations |
|---|---|---|---|---|---|---|
| 0 | Exist | Enable | CP_VENDER_A_TYPE_A | Disk_to_Tape Tape_to_Disk | 128 | 512 |
| 1 | Exist | Enable | CP_VENDER_A_TYPE_B | Disk_to_Tape Tape_to_Disk Disk_to_Disk | 256 | 2048 |
| 2 | Exist | Disable | CP_VENDER_B | Disk_to_Tape | 64 | 128 |
| 3 | Not exist | – | – | – | – | – |

| Storage subsystem number | Snapshot function | Function availability | Type | Maximum Number of pairs | Maximum Number of secondary for a volume | Number of concurrent operations |
|---|---|---|---|---|---|---|
| 0 | Exist | Enable | SS_VENDER_A_TYPE_A | 1024 | 4 | 512 |
| 1 | Exist | Enable | SS_VENDER_A_TYPE_B | 2048 | 9 | 2048 |
| 2 | Exist | Disable | SS_VENDER_B | 512 | 1 | 128 |
| 3 | Not exist | – | – | – | – | – |

| Storage subsystem number | Remote replication function | Function availability | Type | Maximum Number of pairs | Maximum Number of secondary for a volume | Number of concurrent operations |
|---|---|---|---|---|---|---|
| 0 | Exist | Enable | RR_VENDER_A_TYPE_A | 512 | 3 | 128 |
| 1 | Exist | Enable | RR_VENDER_A_TYPE_B | 1024 | 8 | 256 |
| 2 | Exist | Disable | RR_VENDER_B | 256 | 1 | 64 |
| 3 | Not exist | – | – | – | – | – |

366 ⤴

352  354  356  358  360  362  364

STORAGE SYSTEM HAVING VIRTUALIZED RESOURCE

CROSS-REFERENCES TO RELATED APPLICATIONS

The present application is related to and claims priority from Japanese Patent Application No. 2002-125168, filed on Apr. 26, 2002.

BACKGROUND OF THE INVENTION

The present invention relates to a method for controlling a storage system and storage subsystem, and more particularly to a method for controlling a storage system that virtualizes a resource and apparatus thereof.

In an information processing system, there is a possibility that processing in a computer is aborted by a program bug executed in the computer, or the like, causing data included in the information processing system to be in a state of contradiction. In addition, data managed by the information processing system may be erased by human error.

In order to reliably restore the data of the information processing system, which is in such a state, the information processing system generally obtains a backup of the data on a routine basis. Japanese Patent Application Laid-Open No. 2000-132343 describes a storage subsystem which creates a still image copy (snapshot volume), data consistency of which is maintained, in order to obtain a backup without hindering an access to data to be backed up.

According to a snapshot creating method described in the document, data is copied between a source volume and a target volume specified by a host computer, and control such as copy stop for making data still (separation of a volume pair), and data resynchronization, is performed on a volume basis. Such a snapshot volume is used not only for obtaining a backup, but also for realization of a data shift, and data sharing, in which data consistency between databases is maintained.

In addition, Japanese Patent Laid-Open No. Hei 9-274544 describes a storage subsystem which associates storage areas (address conversion) between a logical volume accessed by a host computer and a physical storage device in which data stored in the logical volume is actually stored to process an access, in which there is obtained information about an access from the host computer to the logical volume, and the association is changed to perform physical relocation so that an optimum allocation of the stored data is realized.

Moreover, in Japanese Patent Laid-Open No. Hei 10-333839 and Japanese Patent Laid-Open No. 2000-276406, a storage subsystem characterized by the following is described: when a storage subsystem is accessed from a host computer, using a WWN (WORLD WIDE NAME), which uniquely identifies a fiber channel interface (hereinafter referred to as port) of the host computer, to judge whether or not an access from the host computer to a logical volume of the storage subsystem is allowed; and if a port has no permission, refusing the access to the port.

In recent years, information processing systems have a problem that management cost for a storage device and a storage area increases because data used in the storage device and the storage area has enormously increased. In light of this, "Virtualizing the SAN" (Jul. 5, 2000), which is a report by Morgan Keegan, a research company, shows a system that virtualizes a logical volume, which is provided by a storage subsystem, according to a request from a host computer, and that provides a host computer with this virtual volume that has been virtualized.

In this report, several kinds of system configurations that realize the virtualization are described.

One system is characterized by the following: connecting a computer for realizing the virtualization between a host computer and a storage subsystem; and by using this computer, providing the host computer with an area constituted of one or more volumes as a virtual volume for converting an access from the host computer to the virtual volume into an access to a corresponding logical volume.

For another example, a host computer is connected to a storage subsystem; and a computer which manages an association of a storage area as a logical volume with an area as a virtual volume is connected to the host computer. When the host computer accesses the virtual volume, the host computer sends an inquiry to the computer about a location of data to be accessed on the virtual volume. The computer returns a location of the logical volume corresponding to the virtual volume to the host computer. The host computer accesses the volume provided by the storage subsystem using the received information about the location of the logical volume.

As used herein, the term "storage subsystem" refers to a storage apparatus or device including one or more storage controllers configured to process information and one or more storage components configured to store data (e.g., disks, tapes, etc.). Examples of storage subsystems include disk array units.

As used herein, the term "storage device" or "storage unit" refers to any storage apparatus configured to store data therein. Examples of storage devices include storage subsystems, hard disk drives, CD-ROMs, and magnetic tapes.

As used herein, the term "storage system" refers to a system including one or more storage device that is coupled to one or more information processing unit. Examples of storage systems include storage area network systems, network area storage systems, and storage subsystems.

BRIEF SUMMARY OF THE INVENTION

When a host computer uses a plurality of storage areas and a plurality of logical volumes, integrally controlling the plurality of storage areas and the plurality of logical volumes, so that each control is associated with the other, such a configuration enables advanced system operation and management, leading to a reduction in time required for processing, a reduction in load of processing of the host computer, and easy management. However, the conventional control method, and the management method, in which a function of a storage subsystem is individually controlled using software (management software) on the host computer and a management server, cannot achieve an association of functions between storage subsystems.

In particular, if there is a difference in variety of functions (i.e., if kinds of functions included in a storage subsystem are different from those included in the other storage subsystems) and if specifications of a function are different even if a kind of the function is the same as, or similar to, that in the other storage systems, and if a certain storage subsystem does not have a specific function, and the like, the host computer cannot apply a function to a storage area and a volume in each storage subsystem in a unified manner and cannot achieve an association of functions between the storage subsystems.

In addition, if virtualization is performed in an information processing system, for example, one virtual volume used by a host computer may extend over a plurality of storage subsystems or storage devices. However, in the prior art, the host computer could not use a function of a storage subsystem in a unified and associated manner for a virtual volume.

Moreover, as far as the control method and the management method used in the conventional storage subsystem are concerned, it was not possible to realize operation and management, such as, for example, performance tuning, in which a function provided by a storage subsystem is associated with different functions.

Moreover, in the prior art, the association of the functions among the plurality of storage subsystems, and the association of each function with the other functions could not be controlled on the basis of information about a device configuration of a host computer, and information about application software, a database management system, middleware, a file system, and the like, on the host computer.

On the other hand, in an information processing system in which virtualization is performed, the following method can be considered: creating a snapshot and a replication for a storage subsystem by a computer for performing virtualization processing (hereinafter referred to as virtualization server); and providing a host computer with the functions as described above such as reducing a load of the host computer and a load of a network, facilitating system management, and ensuring security. However, although this method permits functions for a virtual volume to be provided in a unified manner, a load of processing of a virtualization server increases. In this case, the virtualization server executes virtualization processing of a storage area, and processing of an access from the host computer to the virtual volume. Therefore, an increase in load caused by the function processing hinders the processing of an access from the host computer, resulting in a decrease in I/O performance, which leads to a decrease in processing performance of the information processing system.

In addition, creating a snapshot and a replication for the storage subsystem by the virtualization server increases a transfer load, and a processing load, on a network which connects the virtualization server to the storage subsystem, and also increases those on an I/O interface unit between the host computer and the storage subsystem (an interface unit connected to the network). If the network and the interface unit are also used for processing of an access from the host computer, the processing of an access from the host computer is also hindered likewise, resulting in a decrease in I/O performance, which leads to a decrease in processing performance of the information processing system.

One embodiment of the present invention relates to a computer system capable of adjusting a difference in variety of functions among a plurality of storage subsystems having the functions, and a difference in specifications of the functions, and capable of using functions of the plurality of storage subsystems integrally in such a manner that each function is associated with the other functions.

Embodiments of the present invention relates to a computer system capable of operation and management in which a plurality of functions included in storage subsystems are integrally associated; a computer system capable of controlling an association of functions among a plurality of storage subsystems, and an association of each function with the other functions on the basis of information about application software, and middleware, and a host computer; a computer system capable of reducing a load of a virtualization server in an information processing system where virtualization of a storage area is performed; a computer system capable of controlling functions included in storage subsystems on the basis of a virtual volume.

In one embodiment, a storage system configured to provide a storage area to a host coupled to the storage system includes a first storage device of first type being configured to store data and provide one or more data-storage-related functions. A second storage device of second type is configured to store data and provide one or more data-storage-related functions. A virtual volume provides a storage location and being associated with at least one of the first and second storage devices. A database includes information relating to the one or more data-storage-related functions that the first and second storage devices are configured to perform. A first server is coupled to the first and second storage devices and having access to the database, the first server being configured to access the database in response to a data-storage-related-function request from the host involving at least one of the first and second storage devices. The database is accessed to determine whether or not the at least one of the first and second storage devices is capable of performing the request from the host. The first server further being configured to perform the request if the determination is negative or provide an instruction to the at least one of the first and second storage devices to perform to the request if the determination is positive.

In one embodiment, a method for managing a storage system having first and second storage devices and a first server includes providing a database including information relating to one or more data-storage-related functions that the first and second storage devices are configured to provide; receiving at the first server a request relating to a data-storage-related function from a host computer, the request involving at least one of the first and second storage devices; determining whether or not the at least one of the first and second storage device is able to perform the request by accessing the database; and instructing the at least one of the first and second storage device to perform the request if the determination is positive.

In another embodiment, a computer readable medium for use in managing a storage system having first and second storage devices and a first server includes code for receiving at the first server a request relating to a data-storage-related function from a host computer, the request involving at least one of the first and second storage devices; code for determining whether or not the at least one of the first and second storage device is able to perform the request by accessing a database, the database including information relating to one or more data-storage-related functions that the first and second storage devices are configured to provide; code instructing the at least one of the first and second storage device to perform the request if the determination is positive; and code for enabling the first server to perform the request if the determination is negative.

In another embodiment, a server for managing a storage system, wherein the server is coupled to first and second storage devices and a host, the server having access to a database including information relating to one or more data-storage-related functions that the first and second storage devices are configured to provide, includes a processor to process information; an interface coupled to a network that is coupled to the first and second storage devices and the host; and a computer readable medium. The computer medium includes code for receiving at the first server a request relating to a data-storage-related function from a host computer, the request involving at least one of the first and second storage devices, code for determining whether or not the at least one of the first and second storage device is able to perform the request by accessing the database, code instructing the at least one of the first and second storage device to perform the request if the determination is positive, and code for enabling the first server to perform the request if the determination is negative.

BRIEF DESCRIPTION OF THE DRAWINGS

FIG. 6 depicts address information relating to association of virtual volumes and storage devices according to one embodiment of the present invention;

FIG. 7 depicts association of path address and logical unit number provided to a host and virtual storage area according to one embodiment of the present invention;

FIG. 8 depicts association of path address and logical unit number used to access storage areas in a storage device according to one embodiment of the present invention;

FIG. 9 depicts a process for performing a backup and archive function according to one embodiment of the present invention;

FIG. 10 depicts a process for creating a snapshot according to one embodiment of the present invention;

FIG. 11 depicts information about copy function according to one embodiment of the present invention;

FIG. 12 depicts information about snapshot function according to one embodiment of the present invention; and FIG. 13 depicts information about remote replication function according to one embodiment of the present invention.

DETAILED DESCRIPTION OF THE INVENTION

Figure 1:
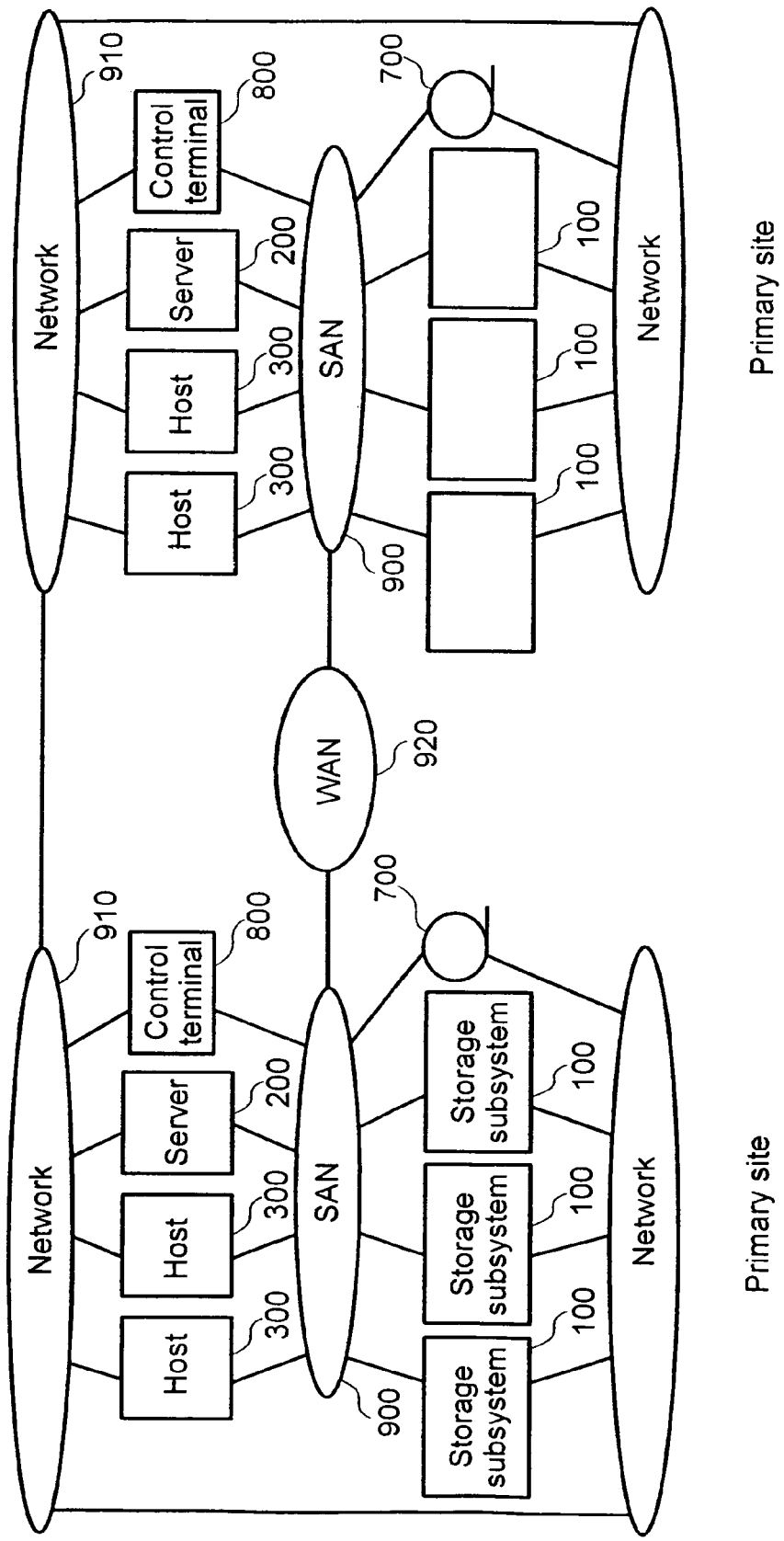
FIG. 1 is a diagram illustrating a configuration of a network or storage system having a primary site and a secondary site according to one embodiment of the present invention.

FIG. 1 is a schematic diagram illustrating a configuration of a storage system according to an embodiment of the present invention. The storage system comprises a primary site and a secondary site, which are connected to each other via a WAN (Wide Area Network) 920.

Each site comprises one or more host computers (hereinafter referred to as host) 300, one or more computers (hereinafter referred to as server) 200, one or more control terminal 800, one or more backup storage device 700, and a one or more storage subsystems 100, which are mutually connected via a SAN (Storage Area Network) 900 comprising a switch 400 and a hub. Examples of a protocol and standards, which are used in the SAN 900, include, for example, Fiber Channel (FC), IP, Infini, and Band. The SAN 900, which is configured according to FC, will be described as an example in the following description.

The host 300, the server 200, and the storage subsystem 100 are also mutually connected via a network 910. An example of a protocol used in the network 910 includes IP.

Figure 2:
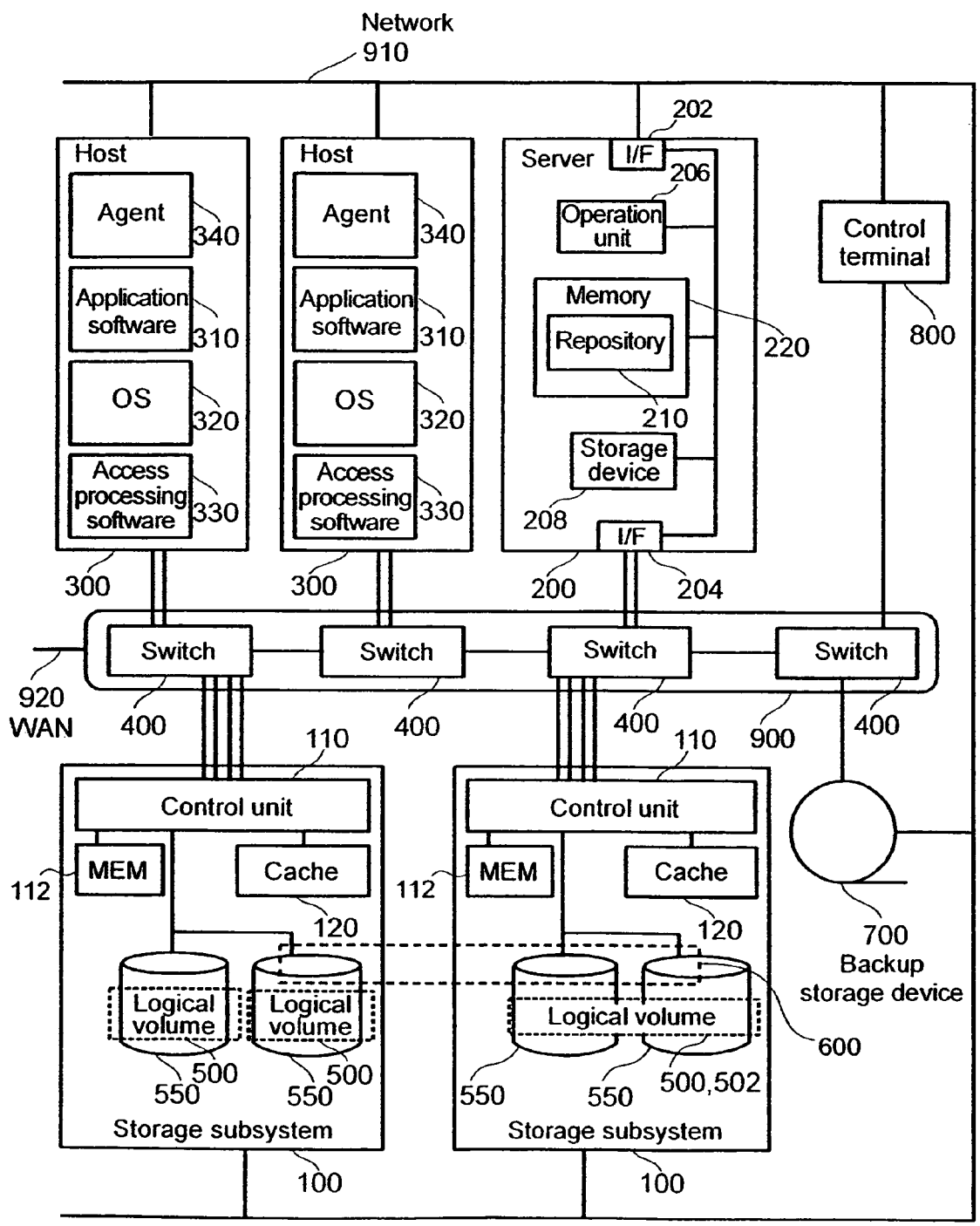
FIG. 2 is a diagram illustrating a configuration of one of the primary or secondary site of the storage system of FIG. 1.

FIG. 2 is a diagram illustrating configurations of the server and the storage subsystems in each site. The server 200, the host 300, the storage subsystem 100, the backup storage device 700, and the control terminal 800 are connected to one another via the network 910. In addition, the server 100, the host 200, the storage device 300, the backup storage device 700, and the control terminal 800 are connected to one another via the SAN 900. More specifically, the SAN 900 comprises a communication line and a plurality of switches 400.

The host 300 comprises a central processing unit (CPU), a memory, and a storage device (not illustrated). The host 300 stores application software 310, an OS 320, access processing software 330, and an agent 340 in the storage device. These programs are read into the memory, and are then executed by the CPU.

An example of the application software 310 includes backup software. In addition, middleware such as database management software (DBMS) and clustering software is also included in the application software 310. Examples of the access processing software 330 include a file system, a device driver, and the like.

The backup storage device 700 is a storage device for storing backup data of data stored in the storage se subsystem 100. Storage media of the backup storage device 700 include a magnetic tape, a magnetic tape library, a magnetic disk, a magneto-optical disk, and the like.

The storage subsystem 100 comprises a control unit (storage controllers) 110, a memory 112, and a disk unit 550. The storage subsystem 100 records and reproduces data used by the host 300 according to a request from the server 200 or the host 300. The number of the disk units 550 included in the storage subsystem 100 is not limited in particular. To be more specific, examples of the storage subsystem include a storage device which is a single disk unit, a cluster magnetic disk unit (JBOD) having the plurality of disk units 550, a disk array which is configured as RAID using the plurality of disk units 550, and the like. The control unit 110 of the storage subsystem 100 provides the server 200 or the host 300 with a logical volume 500 as a data storing area. The storage subsystem 100 associates the logical volume 500 accessed by the server 200 or the host 300 with a storage area of the disk unit 550, which actually stores data stored in the logical volume 500 (that is, address conversion). The logical volume may be associated with a single disk unit or storage device, or associated with a plurality of disk units or storage devices.

The logical volumes, in turn, are associated with a plurality of virtual volumes 600. A virtual volume may be associated with a single storage device or storage subsystem or a plurality thereof. In additionally, a virtual volume may be associated with a single logical volume or a plurality of logical volumes. Alternatively, a plurality of virtual volumes may be associated with a single logical volume.

The control unit 110 holds address conversion information required for the address conversion processing described above, and information required for processing of respective functions described later. Using the address conversion described above, the storage subsystem 100 permits an external device to treat the storage areas possessed by the plurality of disk units 550 as one or a plurality of logical volumes 500. The memory 112 stores computer readable codes for performing various functions, such as volume definition and remote replication, which are described in more detail later. In addition, the storage subsystem 100 has a cache 120.

The server 200, the host 300, and the control terminal 800 have a CPU, a memory, and the like, which are used for executing a program included in each computer.

The server 200 comprises a first interface 202 coupled to the network 910, a second interface coupled to the SAN 900, a control unit or operation unit 206 to process information, a memory 220 wherein the database or repository 210 is provided, and a storage device 208 to store data. In one embodiment, the repository 210 is stored in the storage device 208. The server 200 virtualizes the logical volume 500 provided by the storage subsystem 100 to create a virtual volume 600, and then provides the host 300 with this virtual volume 600 as a storage area. The virtualization is achieved when the CPU of the server 200 executes a director program or a metafile system, which will be described later.

Functions Performed by Storage Subsystem

Figure 3:
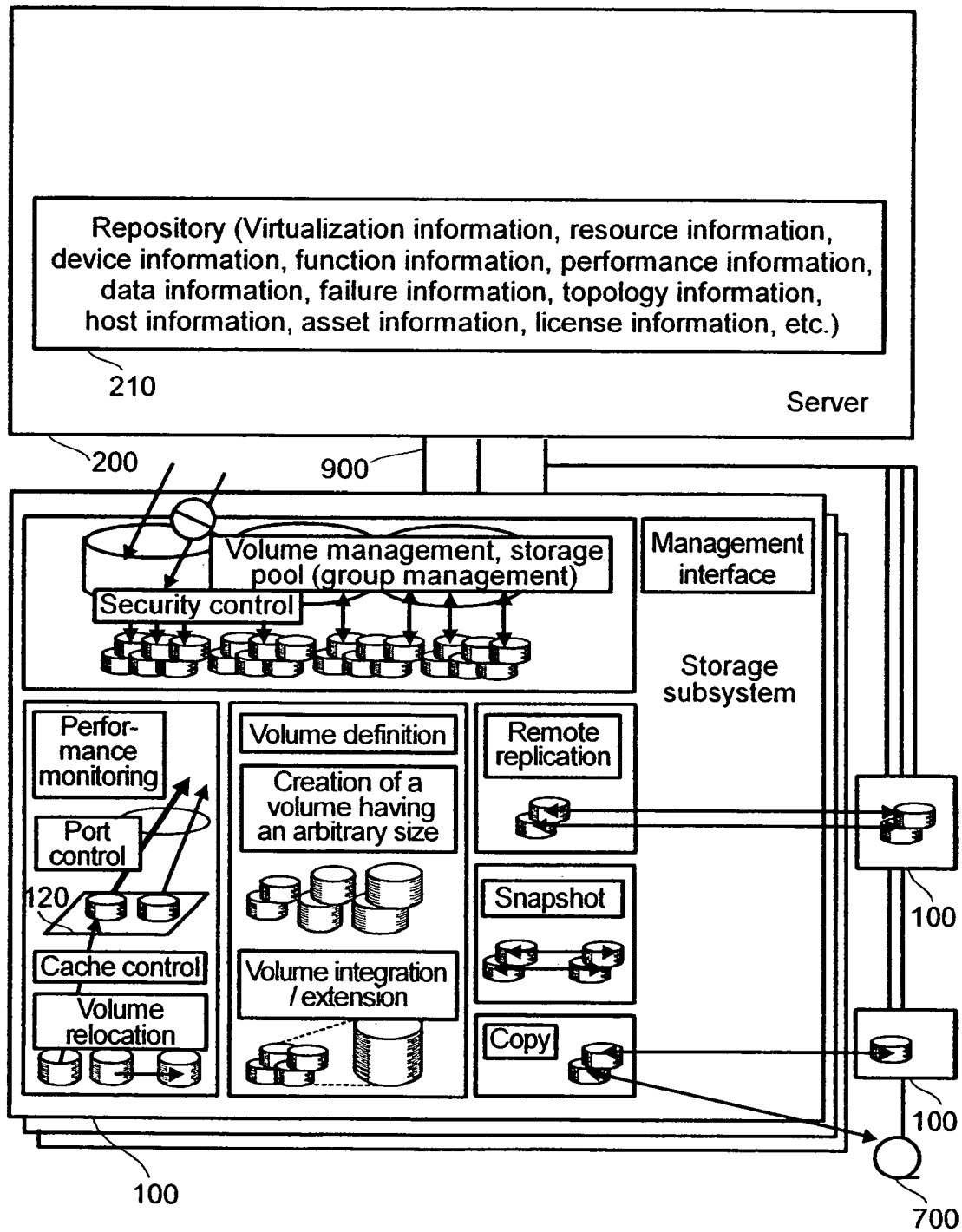
FIG. 3 is a diagram illustrating an example of functions provided in a storage subsystem within a storage system and management interrelationships between the storage subsystem and a server according to one embodiment of the present invention.

FIG. 3 is a diagram illustrating an example of functions included in the storage subsystem 100, and management interrelationships between the storage subsystem 100 and the server 200. The server 200 manages the plurality of storage subsystems 100. Moreover, the server 200 manages functions included in the logical volumes 500, and the storage subsystems, of the plurality of storage subsystems 100, and provides the host 300 with the functions after virtualizing the functions.

The site generally includes a plurality of the storage subsystems 100 that may be manufactured by various different vendors. Accordingly, different storage subsystems may provide different functions and may provide different ways of performing the same functions, such as remote replication and snapshot. The site may also include primitive storage devices (not shown) that have limited information processing capability other than reading out and writing data according to commands of more sophisticated devices, e.g., the server or host computer.

The functions included in the storage subsystem 100 will be described as below. It is to be noted that each of the functions is realized by executing a program associated with the function by the control unit 110 of the storage subsystem 100.

(A) Definition of Volume

A volume defining function is a function of creating a logical volume 500 in the storage subsystem 100. To be more specific, the logical volume 500 is associated with a storage area in the disk unit 600. The volume defining function includes a function of dividing the logical volume 500 into several parts, each of which has an arbitrary size, to define new logical volumes 500. Further, the volume defining function also includes a function of combining a plurality of logical volumes 500 to define a logical volume 500 having a larger size.

(B) Volume Management and Security Control

The storage subsystem 100 has one or more interfaces (physical ports), which are connected to the SAN 900 through a port. A volume management function is a function of assigning the physical port and a logical unit number (LUN), which are included in the storage subsystem 100, to the logical volume 500 created by the volume defining function. The server 200 and the host 300 specify a WWN and a LUN, which are used as an address assigned to a physical port on the SAN 900, to access the logical volume 500.

There are various methods for assigning an address, which indicates a location of the physical port. In any case, an address is assigned so that the physical port can be uniquely identified.

Figure 4:
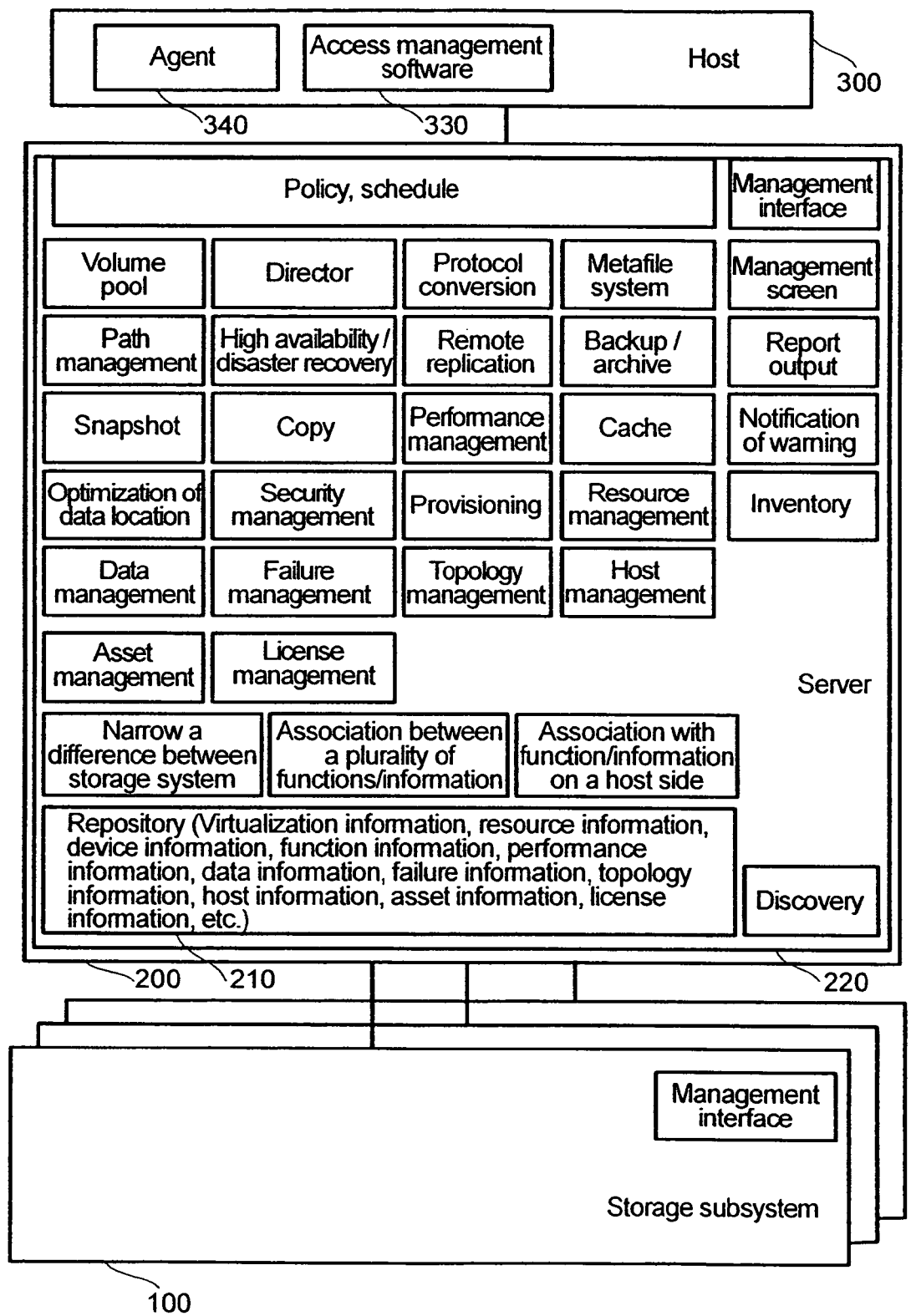
FIG. 4 is a diagram illustrating an example of functions provided in a server and interrelationships among the storage subsystem, the server, and the host according to one embodiment of the present invention.

As shown in FIG. 4, this function includes a function of dividing the hosts 300 and the servers 200, which use one physical port into a plurality of groups, and of assigning a LUN of the logical volume 500 accessed by each host 300 and each server 200 independently on a group basis. To be more specific, the same LUN of one physical port can be assigned to a different logical volume 500 of a different group.

Accordingly, the storage subsystem 100 permits the host 300, etc. to treat one physical port as a plurality of logical ports, and can provide each group with each logical port. In order to realize this function, the storage subsystem 100 holds information about an address (WWN) of a FC interface (hereinafter referred to as host port) possessed by the host 300 and the server 200 which belong to each group. To be more specific, the storage subsystem 100 holds the following information: information about an association of a host WWN (or an ID which is associated with WWN) with a group; and information about LUN assignment on a group basis (information about an association of a LUN with the logical volume 500) in each physical port.

The storage subsystem 100 obtains a host port WWN of the host 300 and the server 200 accessing a physical port, refers to LUN assignment information of a group to which the obtained WWN belongs in order to identify the logical volume 500 to be accessed judging from the specified LUN to be accessed, and then access the logical volume 500.

Moreover, the storage subsystem 100 manages the host port of the host 300 or the server 200, which can access each logical volume 500, using the above-mentioned information, and controls (allows or disallows) an access to the logical volume 500 from the host 300 or the server 200. More specifically, the storage subsystem 100 holds information about the host port of the host 300 or the server 200, which can access a specific logical volume 500, and rejects an access to the logical volume 500 from a host port, information of which is not held. As a result, even if the host 300 or the server 200, which is not allowed to access a logical volume possessed by the storage subsystem 100 is physically connected, it is possible to ensure the security of the logical volume 500.

(C) Snapshot

A snapshot function is a function of creating a snapshot volume of the logical volume 500 in the storage subsystem 100, and a function of managing the created snapshot.

The snapshot function is used for a usual input from, and a usual output to, the storage subsystem 100. For example, the snapshot function is used for the following: obtaining a backup while continuing daily operation (nonstop backup), transferring data between databases, and sharing data between databases.

As soon as the storage subsystem 100 receives an instruction to duplicate, which includes specifications of a source logical volume 500 (primary volume) and a target logical volume 500 (secondary volume), from the server 200, the storage subsystem 100 copies contents of the primary volume to the secondary volume. After the copy processing starts, if an instruction to update data in the primary volume is issued, the storage subsystem 100 also updates data in the secondary volume so that the data update is synchronized. As a result, after the copy processing is completed, the contents of the primary volume are kept synchronized so that the contents of the primary volume always become the same as that of the secondary volume.

In addition, if pair separation is instructed by the server 200, the storage subsystem 100 stops the synchronization of data update with the secondary volume, and then obtains a snapshot volume in the secondary volume at the-time of the pair separation instruction. In this connection, if data in the primary volume is updated after the pair separation, the storage subsystem 100 records a location of the updated data in the primary volume as update information.

After the snapshot volume is used for processing such as backup processing, if the server 200 instructs yet another duplication (resynchronization), the storage subsystem 100 copies updated data of the primary volume to the secondary volume for synchronization on the basis of update information of the primary volume to keep the contents of the primary volume synchronized so that the contents of the primary volume always becomes the same as that of the secondary volume. It is to be noted that in this example of the processing, snapshot obtaining (pair separation) cannot be performed until the contents of both volumes become the same by copying from the primary volume to the secondary volume whereas a snapshot can be obtained in arbitrary timing in a processing example as below.

When receiving an instruction of duplexing from the server 200, which includes information specifying a primary volume and a secondary volume, the storage subsystem 100 prepares information about a difference between the primary volume and the secondary volume before starting a copy between the primary volume and the secondary volume. When starting the copy, the difference information indicates all areas of the primary volume. In this case, information indicating an area where a copy has been completed (including an area with which an update of the primary volume has been synchronized) is excluded as soon as the copy is executed.

As soon as pair separation is instructed by the server 200, it becomes possible to read data from the secondary volume. The storage subsystem 100, which has received from the server 200, or the like, a request to read data from the secondary volume, checks the above-mentioned difference information. If a storage area which is a target to be read has already been copied, the storage subsystem 100 reads the data stored in the secondary volume, and then transfers the read data to the server 200, or the like, which has issued the request. On the other hand, if the data as the target to be read has not been copied to the secondary volume yet, the storage subsystem 100 read the data as the target to be read from the primary volume, transfers the read data to the server 200, or the like, which has issued the request, and also copies the data to the secondary volume before excluding a read target area from the difference information.

When data update of the primary volume is requested after pair separation is instructed, the storage subsystem 100 checks difference information. If data stored in a writing target area has not been copied to the secondary volume yet, the storage subsystem 100 first copies data stored in the writing target area to the secondary volume, and then excludes the area from the difference information. After that, the storage subsystem 100 updates data of the primary volume, and records an update area in its update information.

As a result of the processing described above, even if a copy to the secondary volume is not completed at the time of the pair separation, from the server 200 which reads data, it looks as if a snapshot volume at the time of the pair separation of the primary volume is created in the secondary volume.

It is to be noted that although the relationship between the primary volume and the secondary volume was one to one correspondence in the processing described above, one primary volume may corresponds to a plurality of secondary volumes, or a multigenerational copy in which a secondary volume is a new primary volume can also be realized. In addition, in the above-mentioned processing, a replication is created on a volume basis. However, if the storage subsystem 100 has information used for managing an association between storage areas having an arbitrary size, a snapshot volume can be created for an area having an arbitrary size.

(D) Remote Replication

This function is a function of creating a replication of the logical volume 500 to another location in the storage subsystem 100 via the SAN 900 or another communication line. After the server 200 or the host 300 sets a pair and a data transfer path (pass) between the storage subsystem 100 having a primary volume (hereinafter referred to as primary storage subsystem) and the storage subsystem 100 having a secondary volume (hereinafter referred to as secondary storage subsystem), data is copied from the primary storage subsystem to the secondary storage subsystem once duplexing is instructed by the server 200.

If before pair separation, the server 200 or the host 300 writes data into the primary volume as data update, the primary storage subsystem updates the data stored in the primary volume, and then reports completion of the data writing to the server 200 or the host 300. Moreover, the primary storage subsystem transfers the data to be updated to the secondary storage subsystem in timing irrespective of the data update in order to synchronize the data update with that of the secondary volume.

The secondary storage subsystem, which has received the data to be updated, synchronizes the data to be updated with data in the secondary volume. However, when the data is updated, even if data arrival order is not insured at the time of data transfer from the primary storage subsystem, the secondary storage subsystem synchronizes the data according to an update order on the basis of time series. To be more specific, if data has been written into the primary volume more than once, the secondary storage subsystem synchronizes the data update with that of the secondary volume according to the order in which the data has been written into the primary volume. This permits the consistency of a database to be always kept in, for example, operations accompanied by transaction processing. Accordingly, it is possible to keep the consistency of transaction.

As soon as pair separation is instructed by the server 200, the primary storage subsystem stops transfer of data to be updated to the secondary storage subsystem. The secondary storage subsystem updates the data received before the pair separation was instructed, and then allows the server 200, or the like, to read the data of the secondary volume. In order to ensure the above-mentioned update order, management information including update order is added to a data packet transferred between the storage subsystems 100.

As described above, replicating data between the plurality of storage subsystems 100, and providing the server 200 and the host 300 which use each storage subsystems 100, enables us to build an information processing system capable of failover. To be more specific, if a failure occurs in one system, it is possible to continue processing without interrupting the operations by shifting the processing to the other system using clustering software, or the like, on the server 200 and the host 300.

In particular, operations can always be continued at the time of disaster, or the like, by providing a primary site and a secondary site at a distance so that both sites do not suffer the disaster, or the like, simultaneously. In the above-mentioned processing, a replication is created on a volume basis. However, if the storage subsystem has information used for managing an association between areas having an arbitrary size, a replication can also be created for an area having an arbitrary size.

(E) Copy

A copy function refers to the following functions: on the basis of a copy instruction from the server 200, or the like, the storage subsystem 100 copies data stored in a storage area of the logical volume 500 to another storage subsystem 100 or the backup storage device 700; or on the basis of a copy instruction from the server 200, or the like, the storage subsystem 100 reads data from another storage subsystem 100 or the backup storage device 700, and then copies the data to the logical volume 500 possessed by the instructed storage subsystem 100.

The storage subsystem 100, which has received an instruction to copy data to another storage subsystem 100 or the backup storage device 700, and specification of a storage area, from the server 200 and the host 300, transfers data stored in the specified storage area of the logical volume 500 to said another storage subsystem 100 or the backup storage device 700.

In addition, the storage subsystem 100, which has received an instruction to copy data from another storage subsystem 100 or the backup storage device 700, and specification of a storage area, from the server 200 and the host 300, instructs said another storage subsystem 100 or the backup storage device 700 to read the specified data, and then stores the data transferred from said another storage subsystem 100 in the specified storage area of the logical volume 500.

In the above-mentioned remote replication function, a packet format and a processing protocol which are supported must be common to both of the storage subsystems 100; and processing performed by both of the storage subsystems 100 must be consistent with each other. However, this copy function does not manage a difference between the primary volume and the secondary volume, and does not insure the update order. Because the copy function merely reads and writes data, the above-mentioned restriction is not imposed on both of the storage subsystems 100.

If, for example, the server 200 executes backup software to manage a difference in copy processing, and processing sequence/timing, backup processing can be performed without transfer of data by the server 200 or the host 300. This can reduce a load of the server 200 and the host 300. An example of the copy instruction described above is an EXTENDED COPY command used in the SCSI standard.

(F) Performance Monitoring

A performance monitoring function is a function of collecting information about performance of the storage subsystem 100 using the storage subsystem 100 themselves. As an example of the information about performance, there are the following values which indicate performance or influence performance: performance values including a value showing the number of inputs and outputs (hereinafter referred to as I/O) the logical volume 500 has accepted per unit time, and the quantity of transferred data of a physical port per unit time; a ratio of data write and read; a cache hit ratio; a CPU usage rate; an usage rate of an internal data transfer line; an usage rate of an internal switch; and an usage rate of a magnetic disk unit.

The storage subsystem 100 may accumulate the above-mentioned values as a log. The storage subsystem 100 may also analyze and summarize the accumulated values to notify an external device of them as a report and a warning. In order to provide the external device with the values and the log, the storage subsystem 100 has software interfaces such as MIB/SNMP, C M/XML, and data transfer by read/write commands, and has API and CLI corresponding to these interfaces. On the other hand, the server 200 can perform easily performance planning and performance tuning on the basis of optimization of load balance between the logical volumes 500, optimization of a physical location of the logical volume 500, and optimization of load balance between ports by obtaining the various values described above from the storage subsystem 100 through the software interfaces to analyze them.

(G) Volume Relocation

A volume relocation function is a function of changing a physical location of the logical volume 500 by changing an association of the storage area possessed by the disk unit 550 with the logical volume 500. As described above, the storage subsystem 100 provides the servers 200, or the like, with the logical volume 500 by associating the storage area of the disk unit 550 with the logical volume 500.

The storage subsystem 100 copies data stored in the logical volume 500 to a storage area possessed by another disk unit 550. Then, an association of the source disk unit 550 with the logical volume 500 is changed to that of the target disk unit 550, to which data has been copied, with the logical volume 500. This permits the storage subsystem 100 to change a physical location corresponding to the logical volume 500 without changing logical attributes such as an identifier (a name and a number), and a port assignment, of the logical volume 500. To be more specific, data relocation of the logical volume 500 can be performed without changing settings of the server 200 and the host 300.

For example, if the storage subsystem 100 has the disk unit 550 (disk unit A) characterized by small capacity and high speed, and the disk unit 550 (disk unit B) characterized by large capacity and low performance, the storage subsystem 100 relocates the logical volume 500 storing data of high access frequency to the disk unit A, and relocates the logical volume 500 storing data of low access frequency to the disk unit B. This permits the storage subsystem 100 to store data in a manner that suits performance.

In addition, if one (or a set of) disk unit 550 is associated with a plurality of logical volumes 500 which store data of high access frequency, and thereby a load is concentrated on the disk unit 550, leading to a decrease in performance of the storage subsystem 100, the storage subsystem 100 can improve the performance by distributing the load, more specifically, by distributing the logical volume 500 storing data of high access frequency among the disk units 550 for relocation. Moreover, the storage subsystem 100 can automatically relocate the logical volume 500 by obtaining a threshold value of a load as a rough standard, a logical volume 500 as a candidate, a schedule, and other algorithm parameters, from the server 200.

(H) Port Control

A port control function is a function of controlling I/O for each physical port of the storage subsystem 100, or for each host port of the server 200 or the host 300. If I/O is controlled for each physical port of the storage subsystem 100, the storage subsystem 100 controls an access from the server 200 and the host 300, which is processed in each physical port of its own, so that I/O performance does not exceed a threshold value provided on a physical port basis.

If I/O is controlled for each interface of the server 200 or the host 300, the storage subsystem 100 obtains WWN of a host port of the host 300 and the server 200, which accesses an physical port possessed by the storage subsystem 100, and then controls an access so that I/O performance does not exceed a threshold value provided on a WWN basis. As a result of the processing described above, it becomes possible to ensure I/O performance for operations which use a certain physical port included in the storage subsystem 100, or for operations which use a certain host port of the server 200 or the host 300. For example, if the same storage subsystem 100 is used for a real system and a development system, even if an access request from the development system increases, it is possible to avoid a decrease in processing performance of the real system which is caused by an increase in processing load, and an increase in band load, of the development system.

As a threshold value relating to the I/O performance, for example, the number of times of I/O per unit time, and the quantity of data transfer per unit time can be specified. In addition, the following processing can also be considered: a threshold value which determines whether or not the port control function is executed is set for processing relating to a port or WWN to which a higher priority is given; and if performance of the processing relating to a port or WWN to which a higher priority is given is smaller than or equal to the set threshold value, the storage subsystem 100 does not apply the port control function to the processing. When processing performance of the storage subsystem 100 is sufficient, this processing can avoid processing relating to a port or WWN to which a higher priority is not given from being restricted more than necessary.

(I) Cache Control

A cache control function is a function by which the storage subsystem 100 holds a storage area of a specified logical volume 500 in whole or in part in the cache 120 of the storage subsystem 100 according to an instruction from the server 200. Temporarily storing data requiring high-speed I/O performance in the cache 120 (for example, high-speed semiconductor memory) having a speed higher than the disk unit 550 enables an improvement in processing performance of an information processing system.

As is the case with processing of a general cache memory, temporarily storing or holding data in the cache 120 does not affect attributes such as an identifier (a name, a number, and an address), and a port assignment, of the logical volume 500 and a storage area which store data. Accordingly, it is possible to continue processing of operations without changing settings of the server 200 and the host 300. As is the case with processing of a general cache memory, timing for starting the data holding in the cache 120 may be the time when the data is accessed, or may also be timing specified in advance which does not relate to reading from the server 200 at all. Holding data in the cache 120 in advance as described in the latter case permits the storage subsystem 100 to provide high-speed access to a first access request.

(J) Management Interface

The storage subsystem 100 does not always have all of the above-mentioned functions. In addition, even if an individual storage subsystem 100 has a similar function, there may be a difference in specifications and limits of the function between manufacturers. 1961 Therefore, the storage subsystem 100 has a software interface (management interface) for providing an external device with information about the function supported by the storage subsystem 100, and specifications and limits of the function (function information). The server 200 and the host 300 can obtain the function information from the storage subsystem 100 through the management interface. On the other hand, the storage subsystem 100 provides information required when the server 200 and the host 300 uses or controls a function possessed by the storage subsystem 100, and receives necessary information from the servers 200.

Examples of information which is provided or received include the following: creation of the logical volume 500 (a definition, size settings, attribute settings), deletion (release); a physical port of the logical volume 500, an assignment of a logical unit number, cancellation; a definition of a group relating to a host port (WWN) of the host 300 and the server 200; settings of a host port (WWN) of the host 300 and the server 200 which can access the logical volume 500; a pair definition of the logical volume 500 for creating a snapshot, a duplexing instruction, a division instruction, a resynchronization instruction, pair release; a pair definition for creating a replication of the logical volume 500 between the storage subsystems 100, a duplexing instruction, a division instruction, a resynchronization instruction, pair release; a copy instruction (a copy target, a direction, area specification, etc.), obtaining of performance information (the number of I/Os per unit time, the quantity of transferred data per unit time, a ratio of reading and writing, a cache hit ratio, a CPU usage rate, an usage rate of an internal data transfer line, an usage rate of an internal switch, and an usage rate of magnetic disk unit, etc.); obtaining of a performance report; settings, and obtaining, of a performance warning threshold value; a notification of warning about performance; a volume relocation instruction (specification of a target and a source); settings, and obtaining, of a volume automatic relocation parameter (load threshold value, a target candidate, a schedule, an algorithm parameter, etc.); a port control instruction, and cancellation (settings, and obtaining, of a priority or nonpriority port, a priority or nonpriority WWN, upper limit performance, an applicable standard threshold value); cache control instruction or cancellation (specification of a target logical volume and a storage area, specification of loading or prefetch method); and the like.

In addition, the storage subsystem 100 provides the server, or the like, with resource information about a storage area possessed by the storage subsystem 100. For example, the resource information includes the following: an identifier (a name and a number) of the logical volume 500 possessed by the storage subsystem 100; a size, attributes, and a kind, of the logical volume 500; information about whether or not the logical volume 500 is assigned to a path; and a path to which a corresponding logical volume 500 is assigned, and a logical unit number.

Moreover, the storage subsystem 100 provides an external device with device information used for identifying the storage subsystem 100 from a device connected to the San 900. The device information includes, for example, a vendor name, a model name, a version, a production number, of the storage subsystem 100.

Further, the storage subsystem 100 provides an external device with information (configuration information) indicating a module and parts, which constitute the storage subsystem 100, and the number. The configuration information includes, for example, a kind, the number, an identifier (a name and a number), a location, attributes, a state (whether or not it can be used, whether or not a failure has occurred), of parts such as a physical port, a CPU, a CPU board, a cache memory, a local memory, a sharing memory, a disk unit, an internal data transfer line, an internal switch, and a cabinet.

In addition, the storage subsystem 100 detects a failure occurred in a configured module or part of the storage subsystem 100, or an abnormal condition of processing thereof to identify a position of the failure or the abnormal condition, and then identifies a kind, and a state, of the failure or the abnormal condition before notifying the server 200 or the host 300 of them. The storage subsystem 100 may have information used for assuming a cause and measures judging from a position, a kind, a state, of a failure and an abnormal condition so as to notify the server 200 or the host 300 of the identified cause and measures together. The server 200 or the host 300 receives the notification from the storage subsystem 100. Moreover, the server 200 or the host 300 can also send an inquiry to the storage subsystem 100 about the failure information as described above in arbitrary timing to obtain the failure information.

Software interfaces used for providing each of the information described above by the storage subsystem 100 include the following: MIB/SNMP and CIM/XML using the network 910; data transfer by read/write/INQUIRY/MODE SENSE/ MODE SELECT commands according to the SCSI standards using San 900; a specific protocol; API and CLI for using them; and the like.

As shown in FIG. 3, the server 200 detects (discovers) a device connected to the SAN 900, such as the storage subsystem 100, the backup storage device 700, the switch 400, the hub, the host 300, etc., through the network 910 and the San 900, and then collects various kinds of information from a device to create a database 210 (it is called a repository). The information collected and stored in the repository 210 relates to device types, functions the devices can perform, association information of the devices, and other information needed to provide virtualized resources and management thereof. Examples of such information are provided in FIGS. 6-8 and 11-13. In one embodiment, the methods used to collect such information is similar to methods used to collect management information by management servers coupled to conventional SAN systems. The repository 210 may be provided within the server or at a remote location that is accessible by the server.

Using the various kinds of protocols, the server 200 obtains the various kinds of information from the storage subsystem 100, and then stores the information in the repository 210. More specifically, the repository 210 includes the various kinds of information about each storage subsystem 100, which were exemplified above. Further, the server 200 records, in the repository 210, information about a vendor name, a model name, a version, a production number, and the like, as device information, which are used for identifying each device connected to the San 900.

In addition, the server 200 obtains information about a host bus adapter of the host 300, a configuration of a host port, and a virtual volume 600, which is being used, from the host 300, and then registers the information in the repository 210. Moreover, the server 200 obtains information about a configuration of a physical port of the switch 400, and the like, from the switch 400, and then registers the information in the repository 210. Furthermore, the server 200 analyzes topology of devices, which are connected to the San 900, and then records the topology in the repository 210 as topology information.

The server 200 detects a change in configuration of the devices, which are connected to the San 900, a change in topology, etc., and then updates the information stored in the repository 210 to hold new information. Moreover, the server 200 can find a time-series change in configuration of the devices, which are connected, to the San 900, a time-series change in topology, etc. by holding an update history of the repository 210. Additionally, the server 200 also obtains, from the agent 340 of the host 300, information about the virtual volume 600 used by the application software 310, an area of the virtual volume 600, a tendency of use, performance, and the like, and then records the information as host information in the repository 210 together with the above-mentioned information.

Functions Provided by Server

FIG. 4 is a diagram illustrating an example of functions that are provided by the server 200 to the host 300. The server 200 provides the host 300 with the virtual volume 600 and a function associated with the virtual volume 600 according to an instruction, or a request, from the host 300. When providing a function associated with the virtual volume 600, the server 300 virtualizes a function associated with the logical volume 500, which is provided by the storage subsystem 100, to provide the function.

In addition, the server 200 checks whether or not a function possessed by a storage subsystem 100 exists. Then, according to the result of the check, the server 200, by itself, executes processing such as copy, or instructs the storage subsystem 100 to execute processing so as to perform distributed processing in an individual device. Each function of the server 200, which is exemplified in FIG. 4, will be described as below. These functions are read from the storage device of the server 200, and are realized by executing a program corresponding to each function, which is stored in the memory 220.

(A) Volume Pool

Figure 5:
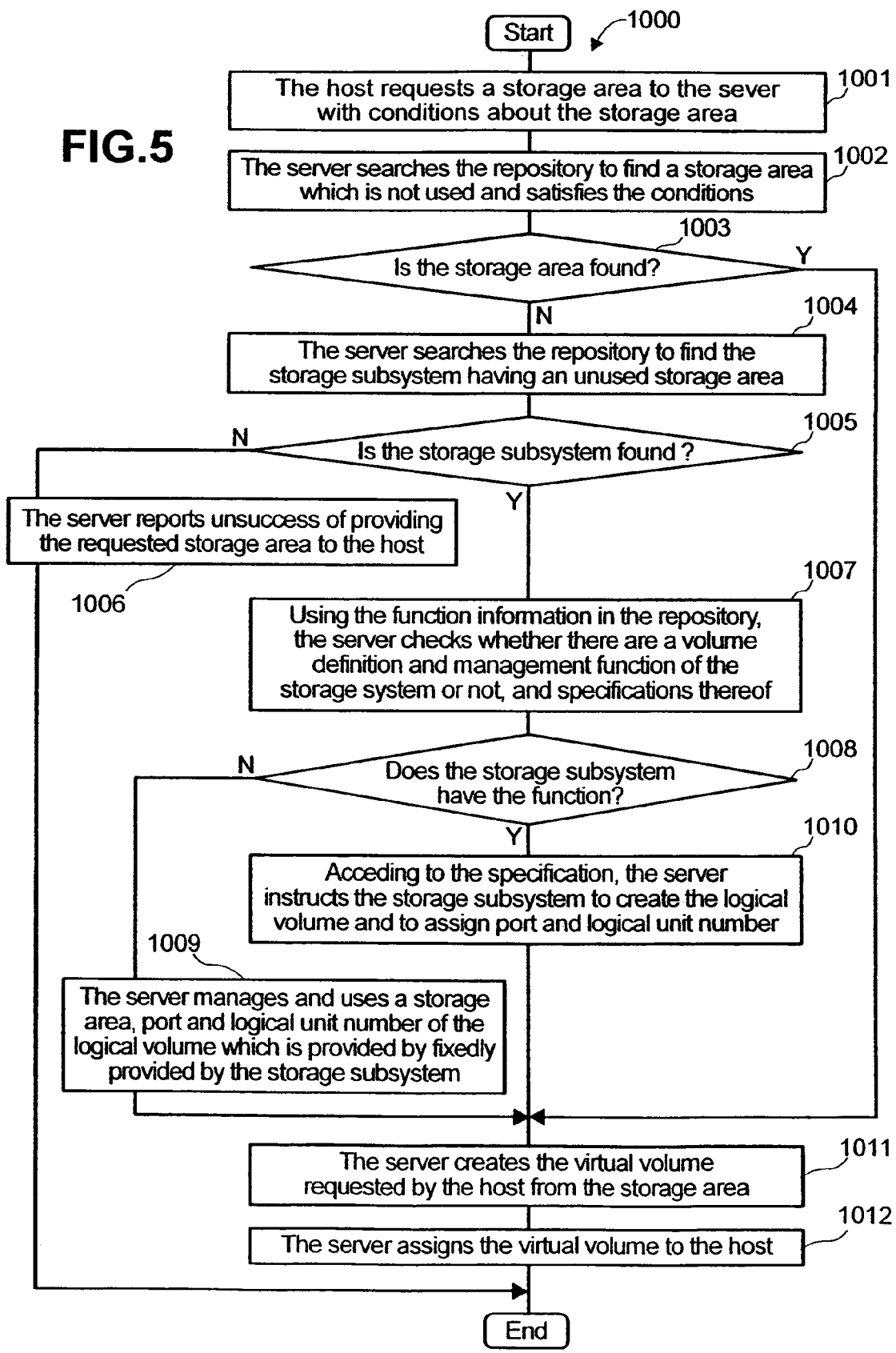
FIG. 5 is a process for performing a volume pool function according to one embodiment of the present invention.

FIG. 5 illustrates a volume pool process 1000 according to one embodiment of the present invention. The server 200 provides the host 300 with a storage area of the logical volume 500 as the virtual volume 600 by executing a director function and a metafile system, which will be described later. The host 300 executes the agent 340, the application software 310, the OS 320, or the access processing software 330, and specifies conditions such as a size and attributes to be sent to the server 200 as a request for additional storage space (step 1001). The server 200 receives the request and searches the repository 210 to find a storage area of the logical volume 500, which is not used and satisfies the conditions (step 1002). At step 1003, if an appropriate storage area is found in the logical volume 500, the server 200 proceeds to create the virtual volume 600 requested by the host 300 using the storage area that has been located in the logical volume (step 1011), and then assigns the virtual volume 600 to the host 300 (step 1012).

At step 1003, an appropriate storage area is not found in the logical volume 500, the server 200 searches the repository 210 to find the storage subsystem 100 having an unused storage area (step 1004), i.e., the physical storage units are searched. If an available storage area in the storage subsystem 100 is found (step 1005), the server 200 checks whether or not there are a volume definition function and a management function of the found storage subsystem 100 and specifications thereof using function information in the repository 210 (step 1007).

If the found storage subsystem 100 has these functions (step 1008), the server 200 instructs the storage subsystem 100 to create the logical volume 500 and to assign port and logical unit numbers (step 1010). If a sufficient storage area cannot be found in a single storage subsystem, the logical volume 502 is created using a plurality of storage subsystems 100, storage subsystem In such a case, the server 200 instructs each of the storage subsystems 100 to create the logical volume 502 that ultimately satisfies the conditions set forth by the host 300. Each storage subsystem may have different ways of creating and managing the logical volume 502 including interfaces specifications between the plurality of the storage subsystems 100.

At step 1008, if it is determined that the storage subsystem that has been located does not have appropriate capabilities or functions to create a new logical volume, e.g., the logical volume 502, the server 200 creates the new logical volume 502 in behalf of that storage subsystem (step 1009). Examples of such storage subsystem that does not have appropriate capabilities includes storage subsystem a single magnetic disk drive unit or a JBOD. In such a case, the server 200 manages the storage area and the port and logical unit numbers of the logical volume 502.

Thereafter, the server 200 associates the storage area of the newly formed logical volume 502 with the virtual volume 600 according to the request from the host 300 (step 1011). An association of the logical volume 502 with the virtual volume 600 includes the following cases: one virtual volume 600 is associated with one logical volume; one virtual volume 600 is associated with a plurality of logical volumes; and a plurality of virtual volumes 600 are associated with one logical volume. Further, there may also be the case where each of a plurality of logical volumes, which are associated with a virtual volume belongs to a storage subsystem 100 that is different from the other. The associated storage area is then assigned to the host 300 (step 1012).

FIGS. 6-8 illustrates tables 50, 52, and 54 that have been created during the above volume pooling operation. The table 50 provides information about association of virtual volumes with the logical volumes and physical storage units. A column 56 provides virtual volume numbers; a column 58 provides the size of virtual volume; a column 60 provides storage subsystem numbers; a column 62 provides logical volume numbers; a column 64 provides storage area addresses; and a column 66 provides the size of storage area. For example, a row or record 68 indicates that the virtual volume 0 has size of 4000, is associated with a storage subsystem number 1 and a logical volume unit 2. The storage area address of the logical volume number 2 starts at 10000, and the storage area size of the logical volume number 2 is 4000.

The table 52 provides information provided to the host 300 about association of path address and logical unit number, so that the host can provide appropriate path information to the server to access the virtual volumes. A column 68 provides path addresses that have been provided to the host by the server; a column 70 provides logical unit numbers; and a column 72 provides virtual volume numbers. For example, a row or record 74 provides information that the host needs to access the virtual volume number 0 that is associated with the logical unit number 1.

The table 54 provides information provided to the server 200 about association of a path address and logical unit number, so that the server may access appropriate storage subsystems corresponding to the logical volumes that are associated with the virtual volumes specified by the host. A column 76 provides information of path address to the storage subsystems; a column 78 provides information about logical unit numbers; a column 80 provides information about storage subsystem numbers; and a column 82 provides information about virtual volume numbers. For example, a row or record 84 provides path information needed to access the virtual volume 0.

(B) Backup and Archive

FIG. 9 illustrates a backup and archive process 1100 performed according to one embodiment of the present invention. Backing up data stored in the virtual volume 600 permits the host 300 to recover the data and restart normal operations even if a contradiction of the data arises or the data is lost.

The server 200 checks the location of a destination of the backup data of the virtual volume (step 1101). If the destination is the same location as the source, i.e., merely a snapshot of the virtual volume is desired, the server 200 creates a snapshot of the data in the virtual volume (step 1103). The steps involved in performing the snapshot operation are described later. The server or another backup software records the management information about the backup data and media (step 1109).

A snapshot of the data is also made if the destination is in a remote location, i.e., the destination is different than the source, in order to initiate the backup operation (step 1102). The snapshot function ensures that the data that have been backed-up are consistent with the source data. For this purpose, the server 200 identifies the timing of the snapshot creation by obtaining information about processing of the application software 310 and the OS 320 from the agent 340 executed by the host 300, and by executing the agent 340 and the access processing software 330 to control an access request from the application software 310 and the OS 320, and an access from the host 300 to the virtual volume 600.

The server 200 checks function information of the repository 210 to determine whether relevant storage devices (i.e., destination devices) have copy function capabilities and availability thereof (step 1104). The destination devices may be sophisticated storage devices, such as storage subsystems having controllers, or primitive disk drives that have limited information processing capabilities. Generally, the storage subsystems have copy functions and primitive disk drives do not. If the destination storage devices have the copy function (step 1105) and if the copy function may be used for the specific backup operation in question (step 1106), the server instructs the storage devices to copy the data from the snapshot volume to the destination (step 1107). Thereafter the process 1100 proceeds to the step 1109. In one embodiment, at the step 1109 the server 200 stores management information about backup data including a backup target, backup date and time, a version relating to the backup and the restore, and management information about a media which records the backup data are stored in the repository 210. Alternatively, such information may be managed by backup software.

At steps 1105 and 1106, if the destination storage devices either do not have copy capabilities or such a copy capabilities are not suitable for the backup operation in question, the server copies the snapshot data to the destination storage devices (step 1108). Thereafter, the process proceeds to the step 1109. However, such operations by the server increase its load, which may not be desirable.

FIG. 11 illustrates a table 150 relating to copy capabilities of various storage devices in the storage system according to one embodiment of the present invention. The table 150 is accessed and used in the step 1105 and 1106 to determine whether the copy function can be performed by the destination storage devices or the server. A column 152 identifies storage devices in the storage system. A column 154 indicates whether a given storage device may perform a copy function. A column 156 indicates whether a given storage device has the copy function available at a given time. A column 158 identifies storage device types. A column 160 provides information about what types of copy functions may be performed by a given storage device. For example, a row or record 166 indicates that the storage device number 0 may copy data from a disk device to a tape device and a tape device to a disk device. A column 162 provides information about maximum destinations a given storage device may serve as. For example, the maximum destination the storage device number 0 can serve as is indicated as 128. A column 164 provides information about maximum concurrent operations that a given storage device can perform.

(C) Snapshot

FIG. 10 illustrates a process 1200 for performing a snapshot function according to one embodiment of the present invention. The snapshot function of the server 200 is a function of creating and managing a snapshot volume of the virtual volume 600 or the logical volume 500 at a certain time. To begin with, the server 200 determines one or more logical volumes 500 that constitute the virtual volume 600 and then determines one or more storage subsystems 100 to where the logical volume 500 is to be replicated (step 1201).

If the replicated data are to be stored in the same storage subsystems, the process proceeds to step 1202. At that step, the server 200 refers to the function information of the repository 210 to check whether or not the storage subsystems 100 in question have the snapshot function and specifications thereof. If the storage subsystems 100 in question have the snapshot function (step 1203), and if the snapshot function can be used from the viewpoint of function specifications (step 1204), the server 200 uses the snapshot function of the storage subsystems 100 (step 1205). Then the server 200 creates a new virtual volume for the replicated data and associates the new virtual volume to the original virtual volume (step 1211).

If at step 1203 it is determined that each storage subsystem does not have the snapshot function or at step 1204 it is determined that the function is not available, the process 1200 proceeds to step 1210, so that the server 200 creates the snapshot volume.

FIG. 12 depicts a table 250 that is included in the repository 210 that is used to determine whether storage subsystems have the snapshot function and whether the function is available for use. A column 252 lists the storage subsystem numbers; a column 254 indicates whether a given storage subsystem has the snapshot function; a column 256 indicates whether the snapshot function is available or not; a column 258 provides information about storage subsystem type; a column 260 provides information about maximum number of pairs (source and destination volumes) a given storage subsystem may have; a column 262 provides information about maximum number of destinations a volume in a given storage subsystem may have; and a column 264 provides information about number of concurrent operations a given storage subsystem may have. If the limits provided in the columns 260, 262, and 264 are reached for a given storage subsystem, the snapshot function for that storage subsystem is disabled and is not available.

Referring back to the step 1201, if the destination volume is provided at a remote location from the source volume, a remote replication is performed. The server 200 refers to function information of the repository 210 to check whether or not the source storage subsystem 100 and the target storage subsystem 100 have the remote replication function and specifications thereof (step 1206). If both of the storage subsystems 100 have the remote replication function (step 1207), and if the function is available to both of the storage subsystems (step 1208), the server 200 notifies both of the storage subsystems 100 comprising a pair of a primary volume and a secondary volume between the storage subsystems, and settings of a data transfer path to initiate replication of data (step 1209). Moreover, when a replication of the virtual volume 600 is used, the server 200 instructs the storage subsystem 100 to separate the pair. Thereafter, the process 1200 proceeds to the step 1211.

FIG. 13 illustrates a table 350 provided in the repository of the server 200 to provide information relating to remote replication functions of storage devices in the storage system according to one embodiment of the present invention. In the process 1200, the table 350 is accessed and used at least in steps 1207 and 1208 to determine whether the server or storage devices need to perform the remote replication. A column 352 identifies storage devices. A column 354 indicates whether a given storage device has remote replication function. A column 356 indicates whether the remote replication function has been enabled or not. A column 358 provides information about the storage device type. A column 360 indicates the maximum number of pairs (source and destination) a given storage device may have. A column 362 indicates the maximum destinations a given volume in a given storage device may server as. A column 364 provides information about the maximum concurrent operations that a given storage device may perform.

If one or both of storage subsystems 100 do not have the remote replication function (step 1207), or if the remote replication function cannot be utilized because of a difference in specifications of the function (step 1208), the server 200 performs the replication of data. To be more specific, the server 200 copies data by reading the data from the primary volume and transferring the data to the secondary volume, and detects data update from the host 300 to the primary volume to synchronize the update with that of the secondary volume. In this case, the server 200 also separates the pair.

However, it is preferable to use the storage subsystems 100 to perform the snapshot function since it reduces the load of the server 200 and the San 900 In addition, if the virtual volume 600 is included in a plurality of logical volumes 500, the server 200 manages a plurality of pairs when creating a snapshot of the virtual volume 600, and selects a method for creating a snapshot before performing processing for each pair. In particular, when separating a pair, even if there are a pair which is separated by the storage subsystem 100 according to an instruction and a pair which is separated by the server 200, the server 200 performs the processing so that the pair is separated in the same timing, and thereby the server can create a snapshot of the virtual volume 600 without contradiction.

In addition, in the above-mentioned processing, the processing is performed on a volume basis. However, if the server 200 has information used for managing an association between areas having an arbitrary size, it is possible to create a replication for an area having an arbitrary size. Moreover, the server 200 can create a replication on a file basis using information about a metafile system.

In order to select a secondary volume when creating a snapshot, the server 200 presents a logical volume 500 and a storage area, which are not used in the storage subsystem 100 where the primary volume exists, to a user, and a system administrator, of the host 300 using a display screen included in the server 200, the host 300, and the control terminal 800. The user and the system administrator determine a secondary volume to be used from the presented contents.

The server 200 provides the host 300 with the secondary volume specified using a method for creating a new virtual volume 600. Automatically providing a secondary volume by the server 200 enables a reduction in work required for determining the secondary volume by the user or the system administrator. As a result of the processing described above, using the snapshot creation function of one or more storage subsystems 100 connected to the SAN 900, or creating a snapshot volume by the server 200 itself, permits the server 200 to adjust or hide an absence of the snapshot creation function, or a difference in specifications thereof, and to create and manage a snapshot of the virtual volume 600 by linking processing for the logical volume 500 in the storage subsystem 100.

It is to be noted that, as is the case with the creation of a replication in another storage subsystem 100, it is also possible to create a snapshot for an area having an arbitrary size. Moreover, the server 200 can create a snapshot on a file basis using information about a metafile system.

Furthermore, using the remote replication function and the snapshot processing at the same time enables creation of a snapshot volume of the virtual volume 600 by a configuration of an arbitrary logical volume 500 in an arbitrary storage subsystem 100. The snapshot function is used for obtaining a backup while continuing operations (nonstop backup), and is also used for, for example, data shift and data sharing, which maintain data consistency between databases.

(D) Director

A director function is a function by which the server 200 provides the host 300 with one or more storage areas included in one or more logical volumes 500 of one or more storage subsystems 100 as a virtual volume 600 by performing address conversion. To be more specific, using this function, the server 200 manages an association of an area of the logical volume 500 and a storage area of the virtual volume 600, and converts an access to the virtual volume 600 by the host 300 into an access to the logical volume 500 before processing an access request by the host 300.

Association information about the storage area of the logical volume 500 and the storage area of the virtual volume 600 is recorded in the repository 210. This association information includes information about association of a port identifier (a name, a number, a WWN, and an ID) and a LUN, which are provided by the server 200 to the host 300 as a port and a LUN of the virtual volume, with a port identifier, and a LUN, of the logical volume 500, which are provided by the storage subsystem 100 to the server 200.

The association information stored in the repository 210 is updated when the virtual volume 600 is changed, for example, it is created, deleted, or extended. Moreover, when an association is established, generating redundant data and distributing data to configure a RAID enables improvement in reliability, availability, and performance, of the data.

(E) Protocol Conversion

A protocol conversion function is a function by which when the virtual volume 600 is provided to the host 300 by the director function, irrespective of a protocol which is used by a device (such as the storage subsystem 100 and the backup storage device 700) connected to another San 900, the server 200 provides the virtual volume 600 as a device corresponding to a protocol used by the host 300.

To be more specific, the server 200 communicates with the storage subsystem 100 using a protocol corresponding to the storage subsystem 100, communicates with the backup storage device 700 using a protocol corresponding to the backup storage device 700, and communicates with the host 300 using a protocol corresponding to the host 300. The protocols used by the storage subsystem 100, the backup storage device 700, and the host 300 may differ even if they are devices of the same kind. When the server detects each device connected to the San 900, the server 200 determines a protocol type corresponding to the device, and then records the protocol type in the repository 210 as device and configuration information.

(F) Metafile System

The server 200 executes a metafile system, and then provides the application software 310, or the OS 320, of a plurality of hosts 300 with a storage area constituted of a plurality of logical volumes 500 as one file system. The host 300 receives a request for accessing the virtual volume 600, which has been issued by the application software 310 or the OS 320, by the access processing software 330, and then executes the access processing software 330 to send an inquiry to the server 200 about a location of data to be accessed in the logical volume 500.

The server 200, which has received the inquiry, sends a reply to the host 300 about the location in the logical volume 500 using the metafile system. The host 300 executes the access processing software 330 to access the logical volume 500, which is provided by the storage subsystem 100, using the location obtained from the server 200.

Read data and written data are directly transferred between the host 300 and the storage subsystem 100. Performing the processing described above by the access processing software 330 of the server 200 and the host 300 permits the application software 310 and the OS 320 to access a file on a metafile system, and to access an arbitrary area (block) on the virtual volume 600.

(G) Path Management

A path management function is a function of managing a path between a physical port of the storage subsystem 100 and a host port of the server 200, a path between a host port of the server 200 and a host port of the host 300, and a path between a physical port of the storage subsystem 100 and a host port of the host 300 to enable virtualization of a storage area, and failover when a failure occurs.

When the server 200 provides the host 300 with the virtual volume 600, if the server 200 newly accesses a port, and a LUN, of the storage subsystem 100 to create the logical volume 500, the server 200 uses the path management function to set a port of the server 200 so that the server 200 can access the logical volume 500 of corresponding port/LUN of the storage subsystem 100.

In addition, if the host 300 newly accesses a port, and a LUN, of the storage subsystem 100, the server 200 executes the path management function to instruct the agent 340 of the host 300 to set a port. The agent 340, which has received the instruction, sets the port of the storage subsystem 100 so that the host 300 can access the logical volume 500 of port/LUN of the storage subsystem 100.

Moreover, if the host 300 accesses the virtual volume 600 provided by the director function of the server 200, the server 200 instructs the agent 340 of the host 300 to set a port using the path management function so that the host 300 can access the virtual volume 600. In addition, as for the storage subsystem 100 having a function of assigning port/LUN of the logical volume 500, if there is a limit of port/LUN of the storage subsystem 100 which can be accessed by the host 300 and the server 200 judging from the topology of the host 300, the server 200, and storage subsystem 100 in the San 900, the server 200 uses the path management function to instruct the storage subsystem 100 to assign port/LUN which can be accessed by the host 300.

In addition, when the host 300 accesses the virtual volume 600 provided by the director function of the server 200, if there is a limit of port/logical unit number of the server 200 which can be accessed by the host 300, the server 200 uses the path management function to assign port/LUN, which can be accessed by the host 300, to the host 300. In addition, judging from the topology of the host 300, the server 200, and storage subsystem 100 in the San 900, if it is necessary to set a zoning function of the switch 400, etc. in order to realize an access from the host 300, the server 200 uses the path management function to perform the settings required for the switch 400.

Moreover, duplexing a path when creating the path between ports, and switching the path at the time of a failure so that it can be used, permits operations to continue even if a failure occurs. For example, when a path is duplexed for the logical volume 500, the server 200 uses the path management function to instruct the storage subsystem 100 having a function of assigning port/LUN of the logical volume 500 to assign two different ports to the target logical volume 500 simultaneously.

Using the path management function, the server 200 can refer to function information of the repository 210 to check whether or not the storage subsystem 100 has a port/LUN assignment function. The server 200 records the above-mentioned information about port/LUN, a path, and zoning in repository 210, and sets, updates, and refers to the information.

(H) High Availability and Disaster Recovery

In this system, the host 300, the server 200, the storage subsystem 100, and the path among them are duplexed; and the path is changed in the event of a failure, which permits operations to continue even if a failure occurs. When the host 300 and the server 200 are duplexed, clustering software is used for another host 300 and another server 200 to duplex them.

In addition, using a remote replication function of the server 200 described below to create a replication of the logical volume 500, which constitutes an arbitrary virtual volume 600, in another storage subsystem 100 enables duplexing of the storage subsystem 100. If a failure occurs in one system, using clustering software on the server 200 and the host 300 to shift processing to the other system permits operations to continue without interruption. If a primary site and a secondary site are provided at a distance so that both sites do not suffer disaster simultaneously, and a system is built in each site, in the event that one site suffers disaster, processing is quickly shifted to the other site for recovery, which permits operations to continue without interruption even at the time of the disaster.

(I) Remote Replication

A remote replication function of the server 200 is a function of creating a replication of the virtual volume 600 or the logical volume 500 in another storage subsystem 100, and managing the replication. To be more specific, the server 200 creates a replication of the logical volume 500, which constitutes the virtual volume 200, in a storage subsystem 100 that is different from the storage subsystem 100 in which this logical volume 500 exists.

In the first place, the server 200 refers to function information of the repository 210 to check whether or not the source storage system 100 and the target storage system 100 have the remote replication function used between the storage systems 100, and to check a difference in specifications of the remote replication function. If both of the storage systems 100 have the remote replication function, and if the function can be executed from the viewpoint of the function specifications, the server 200 notifies both of the storage systems 100 of a pair of a primary volume and a secondary volume between the storage systems, and settings of a data transfer path to instruct a replication of data. Moreover, when a replication of the virtual volume 600 is used, the server 200 instructs the storage system 100 to separate the pair.

In addition, if one storage system 100 does not have the remote replication function (or both storage systems 100 do not have the remote replication function), or if the remote replication function cannot be utilized because of a difference in specifications of the function, the server 200 performs the replication of data. To be more specific, the server 200 copies data by reading the data from the primary volume and transferring the data to the secondary volume, and detects data update from the host 300 to the primary volume to synchronize the update with that of the secondary volume. In this case, the server 200 also separates the pair.

As described above, if the function of the storage system 100 can be used, using the function of the storage system 100 can reduce a load of the server 200 and the San 900. In addition, if the virtual volume 600 has a plurality of logical volumes 500, the server 200 manages a plurality of pairs when creating a replication of the virtual volume 600, and selects a method for creating a replication of data before performing actual processing for each pair. In particular, when separating a pair, even if there are a pair which is separated by the storage system 100 according to an instruction and a pair which is separated by the server 200, the server 200 performs the processing so that the pair is separated in the same timing, and creates a replication of the virtual volume 600 without contradiction.

In order to select a secondary volume when creating a replication of the virtual volume, the server 200 presents information about the logical volume 500 and the storage area, which are not used in storage systems 100 other than the primary storage system 100, to a user, and a system administrator, of the host 300 using a display screen included in the server 200, the host 300, and the control terminal 800. The user and the system administrator determine a secondary volume to be used from the presented contents.

The server 200 provides the host 300 with the secondary volume specified by the user, or the like, using a method for creating a new virtual volume 600. Further, automatically providing a secondary volume by the server 200 enables a reduction in work required for selecting the secondary volume by the user or the system administrator.

As a result of the processing described above, using the replication creation function possessed by a plurality of storage systems 100 connected to the San 900, or replicating data by the server 200, permits the server 200 to adjust and hide an absence of a specific function, and a difference in specifications of a specific function, and to create and manage a replication of the virtual volume 600 in another storage system 100 by associating processing for the logical volume 500 among a plurality of storage systems 100.

In addition, in the above-mentioned processing, the processing is performed on a volume basis. However, if the server 200 has information used for managing an association between areas having an arbitrary size, it is possible to create a replication for an area having an arbitrary size. Moreover, the server 200 can create a replication on a file basis using information about a metafile system.

(J) Copy

The server 200 copies data stored in a storage area of the virtual volume 600 to another virtual volume 600 or the backup storage device 700 according to a copy instruction from the host 300, or the like; and the server 200 reads specified data from the backup storage device 700, and copies the data to the virtual volume 600.

The server 200, which has received the copy instruction, checks the function information in the repository 210. If a copy function of the storage subsystem 100, the backup storage device 700, and other destination devices can be used, the server 200 instructs each device to execute a copy. If each device cannot use the copy function, the server 200 reads data from a specified source, and then transfers the data to a specified target to copy the data. As described above, if the copy function of the storage subsystems 100 can be used, using the copy function can reduce a load of the copy processing performed by the server 200.

(K) Performance Management

The server 200 obtains information about performance, which is measured by the storage subsystem 100, from the storage subsystem 100 connected to the San 900, and then accumulates the information in the repository 210. In addition, the server 200 obtains the following information about an access from the host 300 to the virtual volume 600: for example, the number of I/Os the virtual volume 600 has received per unit time; a read write ratio; a transfer length of I/O; the quantity of transferred data of the server 200 per unit time; a cache hit ratio; a usage rate of an internal data transfer line; and the like. Then, the server 200 registers the obtained information in the repository 210.

Moreover, the server 200 obtains the following information from the agent 340 and the access management software 330: for example, an access area used for a virtual volume of individual application 310, and the OS 320, of the host 300; the number of I/O requests per unit time; a read write request ratio; a transfer length of I/O; the number of I/O requests per unit time in a port of the host 300; a read write ratio; a transfer length of I/O; the quantity of transferred data per unit time; a CPU usage rate of the host 300; a cache hit ratio; and the like. Then, the server 200 records the obtained information in the repository 210.

Further, the server 200 obtains information about performance from devices such as the backup storage device 700, the switch 400, the hub, and the host 300 which are connected to the San 900, and then records the information in the repository 210. The server 200 can determine time-series changes in performance and a tendency of the changes by accumulating performance information recorded in the repository 210 as a log.

In addition, the server 200 provides the performance information, which has been accumulated and recorded in the repository 210 to, for example, an external device of the host 300 or the like. Moreover, the server 200 has a device such as a display screen for example, which is used for presenting performance information stored in the repository 210 to a user or a system administrator. Not only the server 200 but also the host 300 and the control terminal 800 may also have the display screen.

Furthermore, the server 200 analyzes performance information accumulated and recorded in the repository 210 to detect a performance problem and a performance bottleneck of the whole system. Then the server 200 performs the following performance tuning: ensuring QoS by performance planning and load distribution; improving performance by load distribution: optimizing a physical location of the logical volume 500; and the like. An example of processing of load distribution and allocation will be described as below.

If concentration of a load is detected in some resource or component possessed by the host 300, the switch 400, the San 900, the server 200, the storage subsystem 100, etc., which are used for processing an access to the virtual volume 600 or the logical volume 500, the server 200 refers to and analyzes various kinds of performance information, resource information and configuration information of the repository 210 to plan load distribution and allocation. The plan of load distribution and allocation includes load distribution and allocation by moving a physical location of the logical volume 500 (relocation), and load distribution and allocation control by port control.

If a relocation of the logical volume 500 is performed, the server 200 determines a logical volume 500 to be relocated (a source volume) and a target storage area in the above-mentioned plan. If the source volume and the target storage area exist in the same storage subsystem 100, the server 200 refers to function information in the repository 210 to check whether or not the storage subsystem 100 has a volume relocation function, and to check specifications of the function.

If the target storage subsystem 100 has the volume relocation function, and if the volume relocation function can be used from the viewpoint of function specifications, the server 200 specifies a source volume and a target storage area to instruct the storage subsystem 100 to perform the relocation. On the other hand, if the target storage subsystem 100 does not have the volume relocation function, or if the volume relocation function cannot be used from the viewpoint of function specifications, or if the storage subsystem 100 where a source volume exists is different from that where a target storage area exists, the server 200 performs the relocation processing.

To be more specific, in the first place, the server 200 instructs the storage subsystem 100 to create the logical volume 500 of the target storage area (target volume) if necessary so that the target volume is created. Subsequently, the server 200 reads data from the source volume, and then transfers the data to the target volume to copy the data. In addition, the server 200 detects data update from the host 300 to the source volume, and synchronizes the update with that of the target volume. Then, the server 200 changes information about association of a storage area of the logical volume 500 and a storage area of the virtual volume 600, which is recorded in the repository 210, and data location information of the metafile system to change a storage area on the logical volume 500 of the virtual volume 600 which is provide to the host 300.

As a result of the processing described above, the server 200 can change a physical location at which the data is stored without changing logical attributes such as an identifier of the virtual volume 600 (a name and a number).

In addition, when performing port control, the server 200 refers to function information in the repository 210 to check whether or not the storage subsystem 100 has a port control function, and to check specifications of the port control function. If the storage subsystem 100 has the port control function, and if the port control function can be used from the viewpoint of function specifications, the server 200 instructs the storage subsystem 100 to perform the port control on the basis of a plan.

On the other hand, if the target storage subsystem 100 does not has the port control function, or if the port control function cannot be used from the viewpoint of the function specifications, or if the storage subsystem 100 where a source volume exists is different from that where a target storage area exists, the server 200 performs performance control. More specifically, the server 200 processes an access from the host 300 on the basis of the above-mentioned plan so that I/O performance does not exceed a predetermined threshold value. Otherwise, the server 200 requires the access processing software 330 to control performance on the basis of the above-mentioned threshold value. The access processing software 330, which has received the request, processes an access so that I/O performance does not exceed the above-mentioned threshold value. The processing permits the server 200 to realize load distribution and allocation.

An example of processing for optimizing a physical location of the logical volume 500 will be described as below. The server 200 refers to and analyzes the various kinds of performance information described above, and resource information, configuration information, etc. in the repository 210 to plan optimization of a physical location of the logical volume 500. The plan of the physical location optimization includes a shift (relocation) of a physical location of the logical volume 500, and holding of a storage area in the cache 120 by the cache control.

When performing a relocation of the logical volume 500, if the volume relocation function possessed by the storage subsystem 100 can be used, the server 200 uses the volume relocation function; and if the function cannot be used, the server 200 relocates the logical volume.

Moreover, when performing cache control, the server 200 refers to the function information in the repository 210 to check whether or not the storage subsystem 100 having the target storage area has the cache control function, and to check specifications of the cache control function. If the storage subsystem 100 has the cache control function, and if the cache control function can be used from the viewpoint of function specifications, the server 200 selects either the cache 120 of the storage subsystem 100 or the cache possessed by the server 200 as a cache where data stored in a target storage area will be held.

If the data stored in the storage area is held in the cache 120 of the storage subsystem 100, the server 200 instructs the target storage subsystem 100 to hold the data stored in the target storage area in the cache 120. On the other hand, if the storage subsystem 100 does not has the cache control function, or if the cache control function cannot be used from the viewpoint of function specifications of the storage subsystem 100, or if holding the data in the cache of the server 200 is selected, the server 200 holds the data stored in the target storage area in the cache possessed by the server 200.

As a result of the processing described above, it is possible to optimize performance, for example, by the following: data accessed with low frequency is stored in the disk unit 550 which is relatively slow in speed; data accessed with high frequency is stored in the disk unit 550 which is fast in speed; and data accessed with higher frequency is stored in a cache which is faster in speed. Further, if the server 200 can use the cache control function of the storage subsystem 100, using the cache 120 of the storage subsystem 100 and the cache of the server 200 properly on the basis of conditions such as performance, the capacity, a usage rate, of each cache enables optimization of efficiency in use of each cache.

In this connection, the target of the above-mentioned processing was the logical volume 500. However, performing the processing for the logical volume 500, which constitutes the virtual volume 600, also enables performance management, and optimization processing, for the virtual volume 600. In particular, the server 200 can realize performance management, and performance tuning, with higher accuracy by the following processing: referring to host information recorded in the repository 210; analyzing information about the virtual volume 600 used by each application software 310 (including, for example, Enterprise Resource Planning (ERP), DBMS, and message server software), and information such as an area, a tendency of use, and performance, of the virtual volume 600; and performing the processing according to the obtained result of the analysis, and a forecast of a tendency.

Moreover, the server 200 can perform performance management, and optimization processing, for a file by using information of the metafile system. Further, if the server 200 comprises input and output means for interfacing with outside such as a display screen and a management interface, a user, and a system administrator, of the host 300 can specify information about an area of the virtual volume 600 to be used, a current tendency of use, a future tendency of use which is scheduled, a schedule of processing of operations, required performance, and the like, to instruct the server 200 to perform performance management and performance tuning on the basis of the information.

Not only the server 200 but also the host 300 and the control terminal 800 may also have the display screen. Additionally, defining the conditions as described above as a policy by the user, and the system administrator, of the host 300 facilitates management of the conditions.

(L) Security Management

The server 200 manages data access rights of a user and a process of the application software 310, and ensures data security, on the basis of various kinds of information as follows: the relationships among a data access right assigned to a user of the host 300, the virtual volume 600 used by the user, and a storage area possessed by the corresponding virtual volume 600; the relationships among a data access right assigned to a process of the application software 310, the virtual volume 600 used by the process of the application software 310, and a storage area of the corresponding virtual volume; a schedule of using the virtual volume by the user and the process; and the like.

The user, and the system administrator, of the host 300 input the various kinds of information into the server 200 through an outside inputting means such as a display screen or a management interface. The server 200 records the inputted information in the repository 210 as security information. The server 200 judges a host port of the host 300 which accesses the virtual volume 600 provided by the director function using a WWN, etc., and refuses an access to the virtual volume 600 from a host port having no access right.

In addition, the server 200 refers to function information stored in the repository 210 to check whether or not the storage subsystem 100 has the security control function. If the storage subsystem 100 has the security control function, the server 200 instructs the storage subsystem 100, according to information registered in the repository 210, to the effect that security control is performed, and thereby security between the host 300 and the storage subsystem 100 and security between with server 200 and the storage subsystem 100 are provided.

Moreover, if data encryption of the virtual volume 600 is required, the server 200 refers to function information in the repository 210 to check whether or not the storage subsystem 100 in which the logical volume 500 constituting the target virtual volume 600 exists has a data encryption function, and to check specifications of the data encryption function such as encryption algorithm, and encryption strength.

If the target storage subsystem 100 has the data encryption function, and if the data encryption function can be used from the viewpoint of function specifications, then the server 200 instructs the target storage subsystem 100 to encrypt data in the logical volume 500 according to information about encryption. On the other hand, if the target storage subsystem 100 does not have the data encryption function, or if the data encryption function can not be used from the viewpoint of function specifications, the server 200 encrypts data; and even if data encryption by the server 200 is required, a load of the server 200 which accompanies the data encryption processing is reduced as much as possible.

It is to be noted that if the server 200 authenticates a user and a process, which requests an access, using the host 300, the server can perform the above-mentioned processing for the user and the process to manage and control security on a user basis and on a process basis. For example, in response to an inquiry about file and data locations from the access processing software 330 of the host 300, the server 200 notifies the host 300 of a process by which the access processing software 330 requests an access, and a user which executes the process, to perform authentication. After that, the server 200 refuses a user and a process, which have no access right according to the result of the authentication to provide security.

Further, the server 200 can perform security management on the basis of date and time by changing information about the security settings described above according to the above-mentioned schedule information.

(M) Provisioning

When receiving a request for assigning the virtual volume 600 from the host 300, the server 200 analyzes and forecasts the uses, and a tendency of use, of the requested virtual volume 600, and conditions such as performance, reliability, security, and a function, which are required, using the various kinds of information recorded in the repository 210 as described above, and the various kinds of information collected from the host 300 through the agent 340, and thereby assigns the virtual volume 600 which is suitable for the required conditions to the host 300.

For example, if the requested virtual volume 600 requires disaster recovery, the server 200 refers to function information in the repository 210 to find the storage subsystem 100 having the remote replication function. After that, the server 200 assigns the virtual volume 600 to the host 300 using the logical volume 500 of the storage subsystem 100 having the remote replication function.

In addition, if the requested virtual volume 600 is a target to be backed up using a snapshot, the server 200 assigns the virtual volume 600 using the logical volume 500 of the storage subsystem 100 having the snapshot function. As a result of the processing described above, a load of the server 200 and the SAN 900 can be reduced in processing of the host 300 after the assignment.

Furthermore, for example, if a low access frequency and low request performance are expected for the requested virtual volume 600, the virtual volume 600 is assigned to the logical volume 500 associated with the disk unit 550, speed of which is comparatively low. On the other hand, if a high access frequency and high request performance is expected for the virtual volume 600, assigning the logical volume 500 associated with a high-speed disk unit 550 to the virtual volume 600 enables performance optimization at the time of the assignment.

It is to be noted that if the user, and the system administrator, of the host 300 define the uses, and a tendency of use, of the requested virtual volume 600 and the required conditions such as performance, reliability, security, and a function, as described above, as a policy facilitates management of the conditions.

(N) Resource Management

Using resource information and other various kinds of information which are recorded in the repository 210, the server 200 manages the logical volume 500, a port, a path, the cache 120, and the disk unit 550, of the storage subsystem 100 connected to the SAN 900, and classification, attributes, the quantity, the quantity used, and a state, of various kinds of resources such as a port, a path, and a cache, of the server 200. In addition, the server 200 manages classification, attributes, the quantity, the quantity used, and a state, of each virtual volume 600 where these resources are used.

Moreover, the server 200 presents the management information described above to outside through the display screens possessed by the server 200, the host 300, and the control terminal 800, and through a management interface provided by the server 200, and accepts an instruction to assign various resources.

(O) Data Management

Using various kinds of information recorded in the repository 210 and information about the metafile system, the server 200 manages information about classification, attributes, created date and time, date and time when it becomes unnecessary, a stored location (the storage subsystem 100, the logical volume 500, a storage area, a physical storage device, etc.), etc., of data, and a file, stored in the storage subsystem 100 and the backup storage device 700.

The classification and the attributes includes, for example, information about the following: classification, and a generation, of formal data, backup data, a replication, a snapshot, etc.; required performance and reliability; the host 300 and the application software 310 (backup software, a database management system, etc.) which use the data and the file; and the like.

Moreover, the server 200 presents the management information described above to outside through the display screens possessed by the server 200, the host 300, and the control terminal 800, and through a management interface provided by the server 200, and accepts attribute settings, and the like.

(P) Failure Management

The server 200 collects failure information from the storage subsystem 100 and other various kinds of devices, which are connected, to the SAN 900. In addition, the server 200 receives a failure notification from the storage subsystem 100, etc. connected to the SAN 900, and manages it. The server 200 records failure information, which has been collected and received, in the repository 210, and then notifies a user, and a system administrator, of the host 300 of the information.

In addition, if the server 200 has information used for assuming a cause and measures judging from a position, a kind, a state, of a failure and an abnormal condition, the server 200 can notify the host 300 of the identified cause and measures together. The server 200 performs the notification and provides the failure information through the display screens possessed by the server 200, the host 300, and the control terminal 800, and through a management interface provided by the server 200.

Moreover, the server 200 accepts an inventory instruction from the user, and the system administrator, of the host 300 through the display screen and the management interface. The server 200, which has received the inventory instruction, diagnoses the instructed device as a target of the inventory, and then reports the result to the user and the system administrator.

(Q) Topology Management

The server 200 manages topology, a state, zoning, a domain, etc., of a device and a port which are connected to the SAN 900 using topology information and other various kinds of information which are recorded in the repository 210. The server 200 presets the management information described above to an external device through the display screens possessed by the server 200, the host 300, and the control terminal 800, and through a management interface provided by the server 200. In addition, the server 200 accepts a change in topology, and settings of zoning and a domain, and instructs the agent 340, the storage subsystem 100, and the switch 400, of the host 300 to set a port and zoning according to the contents of the change and the contents of the settings.

(R) Host Management

The server 200 manages various kinds of information as follows: host information recorded in the repository 210; a configuration of a host bus adapter, and a port, of the host 300; the relationship of a port with the virtual volume 600 which is used; and the like. In addition, the server presents the management information described above to outside through the display screen possessed by the server 200, the host 300, or the control terminal 800, and through a management interface provided by the server 200.

(S) Asset (Property) Management

The server 200 manages an installed location, a size, the installed date, an owner, the acquired amount, and an asset management state, of the storage subsystem 100, the backup storage device 700, the switch 400, and the control terminal 800 using device information and other various kinds of information which are recorded in the repository 210. Moreover, the server 200 presents the management information described above to outside through the display screens possessed by the server 200, the host 300, and the control terminal 800, and through the management interface provided by the server 200, and also accepts settings, and an update, of the contents of the management information from the outside.

(T) License Management

Using host information and other various kinds of information which are recorded in the repository 210, the server 200 manages a state of license, a range and a period of license, etc., of various kinds of functions provided by the server 200, which are given to the host 300, the application software 310, and a user, and a state of license, a range and a period of license, etc., of various kinds of functions provided by the storage subsystem 100. In addition, the server 200 presents the management information described above to outside through the display screens possessed by the server 200, the host 300, and the control terminal 800, and through a management interface provided by the server 200.

(U) Report Output/Warning Notification

The server 200 gathers, as a report, various kinds of information held in the server 200 including, in particular, resource information, volume pool information, performance information and its change, a performance problem, a performance bottleneck analysis, a load distribution and allocation plan, a data physical location optimization plan, and a forecast of a tendency of use relating to the virtual volume 600 of the application software 310. Then, the server 200 presents the gathered information to a user, and a system administrator, of the host 300.

In addition, the server 200 analyzes and summarizes information about a use state, performance, etc., of a resource. If the information exceeds a threshold value for example, the server 200 warns the host 300, and the user, and the system administrator, of the host 300 of the matter. The server 200 outputs the report and the warning to outside through, for example, the display screens possessed by the server 200, the host 300, and the control terminal 800, and the management interface provided by the server 200.

(V) Management Interface

The server 200 provides an external device with a protocol by which a device connected to the server 200 sets and controls various kinds of functions provided by the server 200, and a software interface through which the device connected to the server 200 refers to and sets various kinds of information held by the server 200. The software interface includes the following: MIB/SNMP and CIM/XML using the network 910; data transfer by READ/WRITE/INQUIRY/MODE SENSE/MODE SELECT commands according to the SCSI standards using SAN 900; and a specific protocol. In addition, the server 200 also has API, CLI, etc. for using them.

Moreover, the server 200, the host 300, and the control terminal 800 can control its own display screen using the software interfaces. Because the server 200 provides the host 300 with the various kinds of functions, which the server 200 integrally comprises, and because the server 200 integrally provides the above-mentioned protocol and management screens, management of only the server 200 by a user, and a system administrator, of the host 300 is sufficient for using the functions. To be more specific, it is possible to facilitate system management, leading to a reduction in system management cost.

In addition, because the server 200 integrally comprises the various kinds of functions and provides the host 300 with them, information required for providing each function can be gathered in the repository 210, which enables a reduction in load of information transfer processing, exclusion processing, and the like, which are required for acquiring and updating information when providing each function.

Moreover, because the server 200 integrally comprises the various kinds of functions and provides the host 300 with them, it is possible avoid a conflict of instructions given to use each function of the storage subsystem 100, which is used for providing the functions of the server 200, and a use conflict, between a plurality of computers. To be more specific, it is possible to reduce a load of exclusion processing when using the function of the storage subsystem 100.

As a result of the processing described above, the server 200 can adjust a difference in variety of functions among a plurality of storage subsystems 100 having the functions, and a difference in specifications of the functions, and associate functions of a plurality of storage subsystems 100 integrally to provide the host 300 with the functions.

In addition, as a result of the processing described above, using the server 200, a user can perform operation and management including, for example, performance management and security management in which a plurality of functions included in the storage subsystem 100 are integrally associated with one another.

In addition, as a result of the processing described above, the server 200 can control an association of functions among a plurality of storage subsystems 100, and an association among a plurality of functions, according to information of the host 300 and the application 310 on the host 300.

Moreover, as a result of the processing described above, when the server 200 provides the host 300 with various kinds of functions which are used for reducing a load of the host 300 and a load of the SAN 900, facilitating system management, ensuring security, and the like, the server 200 can reduce a load of the server 200 itself that virtualizes a storage area.

Further, as a result of the processing described above, the server 200 can control the functions, which are included in the storage subsystem 100, on the basis of the virtual volume 600.

In the above description, the server 200 is configured as a single device or a computer. However, from the viewpoint of configuration, the server 200 may be constituted of a plurality of devices or computers which are mutually connected while the above-mentioned functions are distributed among the devices or the computers. For example, the server 200 may also be configured to have a computer comprising hardware, which has a director function and is specialized in a function of processing an access to the virtual volume 600, and software, which performs various kinds of management, and control, of a device having switch architecture. In the case of this configuration, the server 200 can adopt the architecture, which is optimized in each function, management, and control. As a result, it is possible to improve I/O performance, and performance of each function, management, and control, which leads to a reduction in load of each processing.

According to the present invention, it is possible to provide a computer system, which associates functions, which are included in a server and a storage subsystem, with one another to provide an external device with the functions virtually.

The above detailed descriptions are provided to illustrate specific embodiments of the present invention and are not intended to be limiting. Numerous modifications and variations within the scope of the present invention are possible. Accordingly, the present invention is defined by the appended claims.

What is claimed is:

1. A system configured to provide a storage area to a host coupled to the system, comprising:
   a first storage device being configured to store data and provide one or more functions to be performed by the first storage device;
   a second storage device configured to store data and provide one or more functions to be performed by the second storage device; and
   a first virtualization system coupled to the first storage device and the second storage device and providing a virtual volume associated with at least one of the first storage device and the second storage device, wherein in response to a function request from the host, the first virtualization system is configured to determine whether at least one of the first storage device and the second storage device is configured to perform the function of the function request from the host,
   wherein the first virtualization system is configured to perform the function request if the determination is negative, and
   wherein the first virtualization system is configured to provide an instruction to the at least one of the first and second storage devices to perform the function request if the determination is positive.

2. The system of claim 1 further comprising:
   a database including information relating to the one or more functions that each of the first and second storage devices is configured to perform;
   wherein the first virtualization system is configured to access the database in response to the function request from the host involving at least one of the first and second storage devices, the database being accessed to determine whether or not the at least one of the first and second storage devices is capable of performing the function of the function request from the host.

3. The system of claim 2, wherein the database is a repository and is provided within the first virtualization system.

4. The system of claim 3, farther comprising:
   a second virtualization system coupled to the first and second storage devices to transmit requests for reading data or writing data or both, wherein the first virtualization system is a management system.

5. The system of claim 2, wherein the first storage device is a storage subsystem having a storage area and a storage controller, the first storage device being provided by a first vendor and the second storage device is a storage subsystem having a storage area and a storage controller, the second storage device being provided by a second vendor that is different from the first vendor.

6. The system of claim 2, wherein the first storage device and second storage device are both configured to perform the requested function, the first storage device being configured to perform the requested function in a different way than that of the second storage device.

7. The system of claim 6, wherein the requested function is one selected from the following: volume pool, snapshot, remote replication, copy, and backup/archive, wherein the virtual volume is associated with the first and second storage devices and the requested function involves the first and second storage devices.

8. The system of claim 7, further comprising:
   a third storage device configured to storage data, the third storage device being incapable of performing the following functions: volume pool, snapshot, remote replication, copy, and backup/archive.

9. The system of claim 7, wherein the first storage device is configured to perform the requested function and the second storage device is not configured to perform the requested function, wherein the virtual volume is associated with the first and second storage devices and the requested function involves the first and second storage devices.

10. The system of claim 2, wherein each of the first and second storage devices has one or more logical volumes, and wherein the function of the function request involves movement of data between the logical volumes.

11. The system of claim 2, wherein the function of the function request to be performed by a storage device is selected from the group consisting of definition of volume, volume management and security control, snapshot, remote replication, copy, performance monitoring, volume relocation, port control, cache control, and management interface.

12. A method for managing a system having a first storage device, a second storage device, and a first virtualization system, the method comprising:
   receiving at the first virtualization system a request relating to a function from a host computer, the request involving at least one of the first storage device and the second storage device;
   providing a virtual volume associated with at least one of the first storage device and the second storage device; and
   determining whether at least one of the first storage device and the second storage device is configured to perform the function of the function request from the host;
   wherein the first virtualization system is configured to perform the function request if the determination is negative, and
   wherein the first virtualization system is configured to provide an instruction to the at least one of the first and second storage devices to perform the function request if the determination is positive.

13. The method of claim 12, further comprising:
   providing a database including information relating to one or more functions that the first and second storage devices are configured to provide.

14. The method of claim 13, further comprising:
   enabling the first virtualization system to perform the request if the determination is negative.

15. The method of claim 14, wherein the first and second storage devices are first and second storage subsystems, the method further comprising:
   providing a logical volume associated with the first and second storage devices;
   providing a virtual volume associated with the logical volume, so that the virtual volume is indirectly associated with the first and second storage devices,
   wherein the requested function involves the first and second storage devices, wherein the first storage device is configured to perform the requested
   function and the second storage device is not configured to perform the requested function.

16. The method of claim 14, wherein the first and second storage devices are first and second storage subsystems that are manufactured by different vendors.

17. The method of claim 14, wherein the database is a repository and is provided within the first virtualization system.

18. The method of claim 14, wherein the first storage device and second storage device are both configured to perform the requested function, the first storage device being configured to perform the requested function in a different way than that of the second storage device.

19. The method of claim 18, wherein the requested function is one selected from the following: volume pool, snapshot, remote replication, copy, and backup/archive.

20. The method of claim 14, wherein the first storage device is configured to perform the requested function and the second storage device is not configured to perform the requested function.

21. The method of claim 14, wherein the determining step further comprises:
   determining whether or not the at least one of first and second storage devices has capability to perform the requested function to satisfy the request; and
   determining whether or not the requested function is available to the at least one of the first and second storage devices to satisfy the request.

22. The method of claim 13, wherein each of the first and second storage devices has one or more logical volumes, and wherein the function of the request involves movement of data between the logical volumes.

23. The method of claim 13, wherein the function of the request to be performed by a storage device is selected from the group consisting of definition of volume, volume management and security control, snapshot, remote replication, copy, performance monitoring, volume relocation, port control, cache control, and management interface.

24. A computer readable medium for use in managing a system having a first storage device, a second storage device, and a first virtualization system, wherein the first virtualization system provides a virtual volume associated with the first storage device, the medium comprising:
   code for receiving at the first virtualization system a request relating to a function from a host computer, the request involving at least one of the first storage device and the second storage device; and
   code for determining whether at least one of the first storage device and the second storage device is configured to perform the function of the unction request from the host;
   wherein the first virtualization system is configured to perform the function request if the determination is negative, and
   wherein the first virtualization system is configured to provide an instruction to the at least one of the first and second storage devices to perform the function request if the determination is positive.

25. The computer readable medium of claim 24, wherein the medium further comprises:
   code for determining whether or not the at least one of the first and second storage devices is able to perform the request by accessing a database, the database including information relating to one or more functions that the first and second storage devices are configured to provide, wherein the request received at the first virtualization system involves at least one of the first and second storage devices.

26. The computer readable medium of claim 25, wherein each of the first and second storage devices has one or more logical volumes, and wherein the function of the request involves movement of data between the logical volumes.

27. A virtualization system for managing a system, wherein the virtualization system is coupled to a first storage device, a second storage device, and a host, wherein the virtualization system provides a virtual volume associated with at least one of the first storage device and the second storage device, the virtualization system comprising:
   a processor to process information;
   an interface coupled to a network that is coupled to the first and second storage devices and the host; and
   a computer readable medium, including:
   code for receiving at the first virtualization system a request relating to a function from a host computer, the request involving at least one of the first storage device and the second storage device; and
   code for determining whether at least one of the first storage device and the second storage device is configured to perform the function of the function request from the host;
   wherein the first virtualization system is configured to perform the function request if the determination is negative, and
   wherein the first virtualization system is configured to provide an instruction to the at least one of the first and second storage devices to perform the function request if the determination is positive.

28. The virtualization system of claim 27, wherein the virtualization system has access to a database including information relating to one or more functions that the first and second storage devices are configured to provide.

29. The virtualization system of claim 28, further comprising:
   a storage location to store information, wherein the database is stored within the storage location,
   wherein the system includes a logical volume that is associated with the first and second storage devices and a virtual volume that is associated with the logical volume, so that the virtual volume is indirectly associated with the first and second storage devices,
   wherein the requested function involves the first and second storage devices,
   wherein the first storage device is configured to perform the requested function and the second storage device is not configured to perform the requested function.

30. The virtualization system of claim 28, wherein each of the first and second storage devices has one or more logical volumes, and wherein the function of the request involves movement of data between the logical volumes.

* * * * *